United States Patent
Fukushima

(10) Patent No.: US 6,604,214 B1
(45) Date of Patent: Aug. 5, 2003

(54) ONE-CHIP MICROCOMPUTER CAPABLE OF INTERNALLY PRODUCING ECC DATA

(75) Inventor: Kiyoshi Fukushima, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/286,973

(22) Filed: Apr. 6, 1999

(30) Foreign Application Priority Data

Apr. 9, 1998 (JP) .......................................... 10-097287

(51) Int. Cl.[7] .......................... G06F 11/00; G06F 11/30; G08C 25/00; H03M 13/00; H04L 1/00
(52) U.S. Cl. .................................. 714/746; 365/185.33
(58) Field of Search ........................ 365/185.03, 185.12, 365/200, 201, 207, 206, 226, 185.33; 340/825.1; 714/746, 752, 5–6, 723; 180/287; 307/10.3; 711/170, 103; 345/501; 382/233; 710/68

(56) References Cited

U.S. PATENT DOCUMENTS

| | | | |
|---|---|---|---|
| 5,293,388 A | * 3/1994 | Monroe et al. | 714/752 |
| 5,949,151 A | * 9/1999 | Nakajima | 180/287 |
| 6,145,069 A | * 11/2000 | Dye | 711/170 |
| 6,243,313 B1 | * 6/2001 | Sakamoto et al. | 365/206 |

| | | | |
|---|---|---|---|
| 6,385,085 B2 | * 5/2002 | Sato et al. | 365/185.03 |

FOREIGN PATENT DOCUMENTS

| | | | |
|---|---|---|---|
| DE | 61-201363 | 6/1986 | G06F/15/06 |
| DE | 3903496 A1 | 8/1989 | G11C/29/00 |
| DE | 3-833300 | 9/1991 | G11C/29/00 |
| DE | 5-334071 | 12/1993 | G06F/9/08 |
| DE | 4416171 C2 | 1/1995 | G11C/29/00 |

* cited by examiner

Primary Examiner—Albert Decady
Assistant Examiner—Guy Lamarre
(74) Attorney, Agent, or Firm—Scully, Scott, Murphy & Presser

(57) ABSTRACT

In an one-chip microcomputer used in an automobile, error correction code data is added to corresponding user data, and then the resulting user data is stored into an EEPROM to correct an 1-bit error contained in this user data. The one-chip microcomputer is arranged by an electrically erasable memory for temporarily storing thereinto externally supplied user data and ECC (error correction code) data corresponding to the user data; a program storage memory for previously storing thereinto a program; and a CPU (central processing unit) for reading the program from the program storage memory so as to produce the ECC data based upon the externally supplied user data, and for sequentially correcting errors contained in the externally supplied user data by using the produced ECC data corresponding to the externally supplied user data.

12 Claims, 19 Drawing Sheets

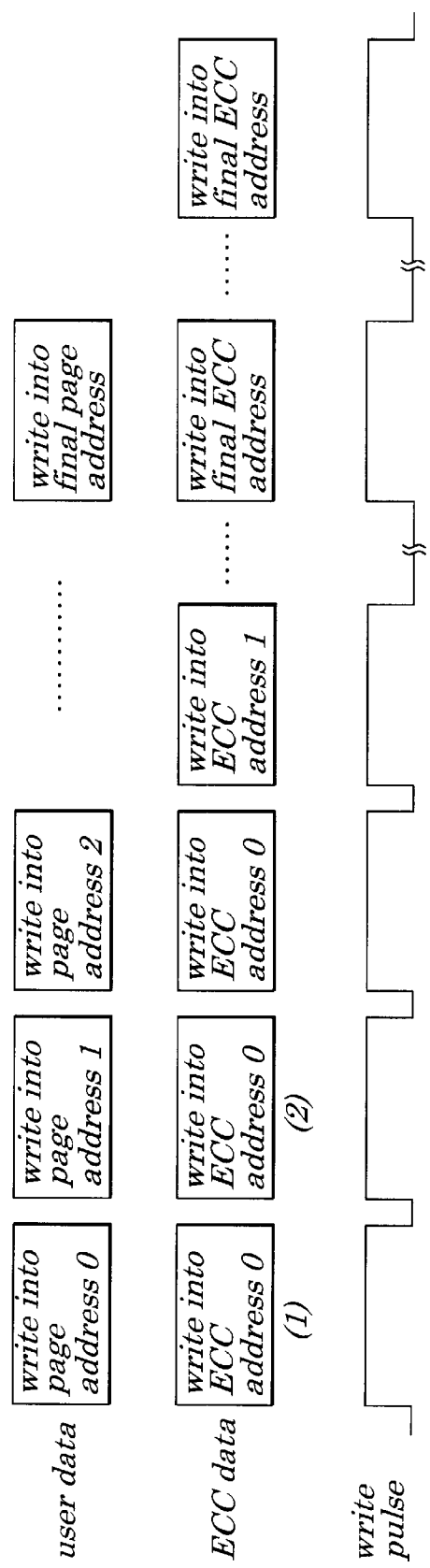

Fig.20 (a) (PRIOR ART)
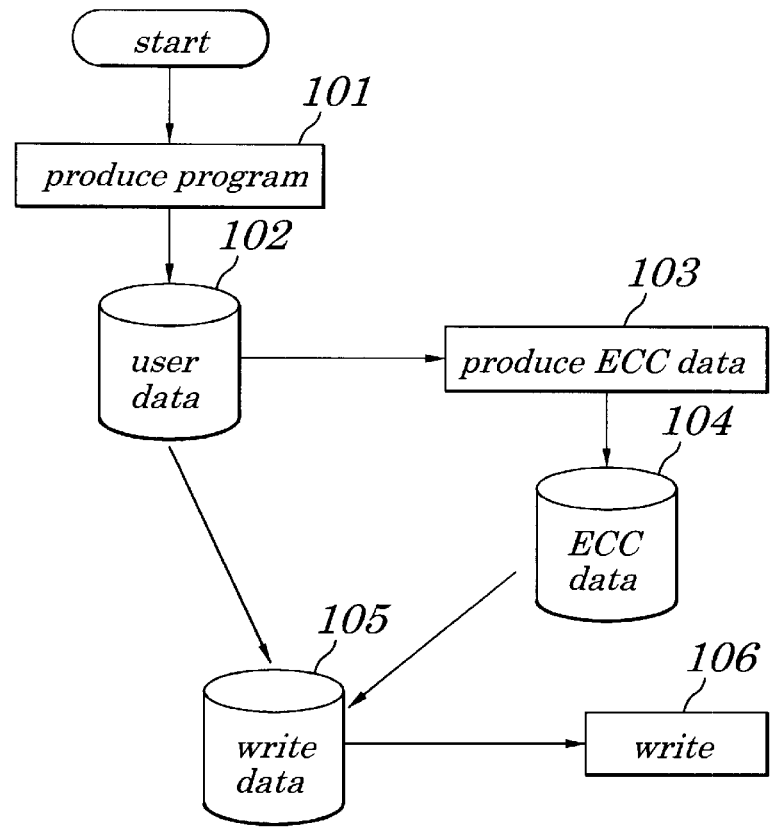
Fig.20 (b) (PRIOR ART)
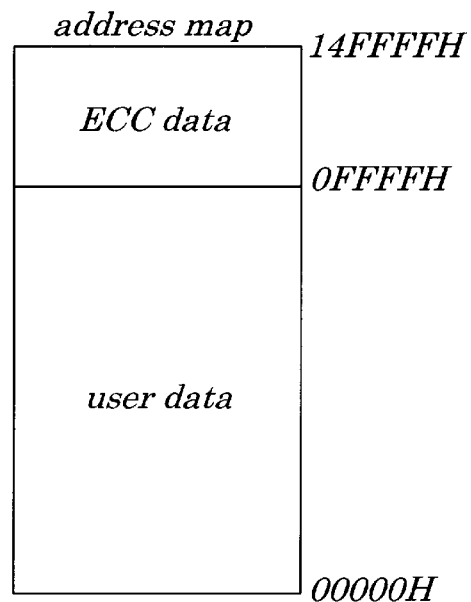

ONE-CHIP MICROCOMPUTER CAPABLE OF INTERNALLY PRODUCING ECC DATA

BACKGROUND OF THE INVENTION

1. Field of the Invention

The present invention is generally related to an one-chip microcomputer capable of internally producing ECC data to add the ECC data to user data. More specifically, the present invention is directed to such an one-chip microcomputer capable of reducing a work load of a user, and also capable of reducing a memory capacity without increasing EEPROM write time based upon the ECC data.

2. Description of the Related Art

EEPROMs (electrically erasable programmable read-only memories) are such memories capable of erasing and/or writing data (including flash EEPROMs), and are usually employed in one-chip microcomputers and the like capable of storing programs. To increase reliability of data saved in EEPROMs, the following error correction method is effectively utilized. That is, while ECC (error correction code) data is added to user data and then the resulting user data added with the ECC data is stored, the error correction is carried out by using the ECC data with respect to the read user data. Conventionally, such an ECC data adding operation is carried out in such a manner that while the ECC data is produced from the user data by using the dedicated software, the produced ECC data is stored into the EEPROM in combination with the user data.

For example, a one-chip microcomputer used to control an engine of an automobile executes such an important control, for example, an engine revolution number control and a fuel injection control based upon a control program. In the case that a storage content of a ROM (read-only memory) for previously storing this control program is changed, this one-chip microcomputer executes an abnormal process operation, resulting in a dangerous condition. As a consequence, when a user stores use data (program and the like) into the ROM, the ECC data is additionally stored in this ROM. When the one-chip microcomputer reads out the user data, if one bit error occurs, then this one-chip microcomputer may correct this 1 bit error, and also if more than 2-bit error occurs, then this one-chip microcomputer may indicate "abnormal" conditions.

Furthermore, when a bug is found in user data (computer program) previously stored in a ROM, an automobile manufacturer should recall sold automobiles so as to replace the defective one-chip microcomputers by properly set one-chip microcomputers. In the bug case, this automobile manufacturer is required to replace an engine control assembly containing a defective one-chip microcomputer when a ROM is arranged by a rewritable ROM such as a mask ROM. In this rewritable ROM case, not only the cost of this engine control assembly, but also the replacement cost are necessarily required. As a result, this automobile manufacturer should accept a large amount of loss. Under such a circumstance, if a ROM of a one-chip microcomputer is arranged by an EEPROM, then the automobile manufacturer is merely required to rewrite a program saved in this EEPROM via a connector of this one-chip microcomputer, so that a total cost of solving the bug problem can be reduced.

FIG. 20 is an explanatory diagram for explaining one conventional ECC data producing/adding method executed in an EEPROM. Now, this conventional ECC data producing/adding method will be explained with reference to FIG. 20.

First, a user forms a predetermined program (step 101 of FIG. 20(a)) so as to produce ECC data. It is now assumed that as user data 102, data defined from 00000H up to 0FFFFH are inputted. The user produces the ECC data based the user data 102 by employing exclusively-used software in accordance with the formed program (step 103 in FIG. 20(a)). As a result, data defined from 10000H up to 14FFFH are produced as the ECC data 104. Next, the ECC data 104 is added to the user data 102 so as to produce data defined from 00000H up to 14FFFH as write data 105, and then these produced write data are written into an EEPROM built in a microcomputer (not shown) (step 106 in FIG. 20(a)). In this case, the write data 105 are written by way of an exclusively-used data writer, or an on-board writing manner.

FIG. 20(b) illustrates an address map on the EEPROM. In this address map, addresses from 00000H to 0FFFFH are allocated as the user data, and also addresses from 10000H to 14FFFH are allocated as the ECC data. A volume of ECC data requires 5 bits in the case of 16-bit data. As a result, a data region as shown in FIG. 20(b) is required.

However, in the above-described conventional ECC data producing/adding method, since the ECC data is produced and the user data is separately processed, there is a problem that the exclusively used software capable of producing the ECC data based upon the user data is required.

Also, since the ECC data is mapped at the addresses after the user data, the data defined from 10000H up to 14FFFH are written as the ECC data in addition to the user data defined from 00000H up to 0FFFFH. As a result, there is another problem that the data writing time would be increased by approximately 30 percents.

Furthermore, since the entire data amount of write data is increased by approximately 30 percents because of the employment of these ECC data, there is a further problem that the total memory capacity of the external memory of the entire system must be increased by approximately 30 percents.

On the other hand, conventionally, one conventional technical idea has been proposed such that the ECC data producing circuit constituted by employing the logic circuits is built in the one-chip microcomputer. Very recently, bit-widths of data buses employed in one-chip microcomputers are increased more and more. That is, although the conventional data buses own bitwidths of 8 bits, the current data buses own bitwidth of 32 bits, or 64 bits. Under such a wide bitwidth trend condition, when a ECC data producing circuit is arranged by logic circuits, an entire circuit scale would be increased in an exponential manner in connection with a increase of such a bitwidth of a data bus. Therefore, an area occupied by this ECC data producing circuit with respect to a semiconductor chip would be necessarily increased.

In the case that an EEPROM is employed so as to store thereinto a program used in an one-chip microcomputer, a ECC data producing circuit is used only when this computer program is stored, but not used when this computer program is executed. Nevertheless, such a technical idea that the ECC data producing circuit having the large circuit scale is built in the one-chip microprocessor would cause the cost effective performance characteristic of this one-chip microcomputer to be deteriorated.

SUMMARY OF THE INVENTION

In view of the above-described problems, it is an object of the present invention to provide a one-chip microcomputer capable of internally producing ECC data.

It is another object of the present invention to provide a one-chip microcomputer capable of reducing a workload given to a user, and further capable of reducing a necessary capacity of a memory without increasing ECC data writing time of an EEPROM.

According to a first aspect of the present invention, there is provided a microcomputer comprising:

an electrically erasable memory for temporarily storing thereinto externally supplied user data and ECC (error correction code) data corresponding to the user data;

a program storage memory for previously storing thereinto a program; and a CPU (central processing unit) for reading the program from the program storage memory so as to produce the ECC data based upon the externally supplied user data, and for sequentially correcting errors contained in the externally supplied user data by using the produced ECC data corresponding to the externally supplied user data.

In the foregoing, it is desirable that, when the externally supplied user data contains a 1-bit error, the CPU corrects the 1-bit error based on the produced ECC data read from the electrically erasable memory, whereas when the externally supplied user data contains more than 2-bit errors, the CPU indicates an abnormal condition.

Furthermore, a mode is preferable in which the electrically erasable memory is a flash memory.

According to a second aspect of the present invention, there is provided a one-chip microcomputer comprising:

an EEPROM (electrically erasable read-only memory) for temporarily storing externally-supplied user data into a user data storage region thereof and also for temporarily storing ECC (error correction code) data corresponding to the user data into an ECC data storage region thereof;

a read-only memory for previously storing thereinto a program; and a CPU (central processing unit) for reading the program from the read-only memory so as to produce the ECC data based upon the externally supplied user data, and for sequentially correcting errors contained in the externally supplied user data by using the produced ECC data.

In the second aspect, it is preferable that, while a preselected amount of the user data are sequentially entered from an external data source, the CPU sequentially produces the ECC data from the preselected amount of user data; writes both the user data and the ECC data corresponding to the user data into the user data storage region of the EEPROM and also the ECC data storage region thereof respectively at the same addresses of the EEPROM; and reads both the user data and the ECC data from the user data/ECC data storage regions at the same addresses so as to sequentially perform the error correction.

Also, it is preferable that, while a preselected amount of the user data are sequentially entered from an external data source, the CPU sequentially produces the ECC data from the preselected amount of user data until one process cycle is completed; writes the user data and ECC data produced after one process cycle has been completed into the user data storage region of the EEPROM and an ECC data storage region thereof having an address decremented by 1 from the address of the user data storage region; and also reads both the user data and the ECC data stored at the same addresses of the EEPROM so as to sequentially perform the error correction.

Furthermore, it is desirable that, while a preselected amount of the user data are sequentially entered from an external data source, the CPU sequentially produces the ECC data from the preselected amount of user data until one process cycle is completed; writes the user data and ECC data after one process cycle has been completed into the user data storage region of the EEPROM and the ECC data storage region thereof at the same addresses, respectively; and also reads the user data stored in the user data storage region of the EEPROM and ECC data stored in the ECC data storage region thereof having an address incremented by 1 from the address of the user data storage region so as to sequentially perform the error correction.

Furthermore, it is desirable that, while a preselected amount of user data are sequentially entered from an external data source, the CPU sequentially produces the ECC data from the preselected amount of user data; outputs invalid data in the case that the production of the ECC data is not accomplished until next user data is entered; writes both the user data and valid ECC data corresponding thereto into the user data storage region of the EEPROM and the ECC data storage region thereof at the same addresses, respectively; and also reads the user data and the ECC data stored at the same addresses of the user data/ECC data storage regions of the EEPROM so as to execute the error correction.

Also, according to a third aspect of the present invention, there is a one-chip microcomputer comprising:

an EEPROM (electrically erasable programmable read-only memory) for temporarily storing thereinto both user data and ECC (error correction code) data corresponding to the user data into a user data storage region and an ECC data storage region, respectively;

storage means for previously storing thereinto a program used to produce ECC data based upon user data;

write control means for controlling writing of both the user data and the ECC data into the EEPROM; and a CPU (central processing unit) for producing ECC data from the user data stored in the EEPROM in accordance with the program, and for storing the produced ECC data and the original user data into the ECC data storage region of the EEPROM and the user data storage region thereof under control of the write control means; and further for reading the user data stored in the user data storage region and the ECC data stored in the ECC data storage region so as to correct an error contained in the user data based upon both the read user data and the read ECC data.

In the third aspect, a mode is preferable in which:

the CPU includes an internal register into which a preselected amount of user data are sequentially stored from an external data source;

the EEPROM further includes a user data register to which the preselected amount of user data are transferred, and an ECC data register; and the CPU produces ECC data from a predetermined amount of user data stored in the internal register thereof; transfers the produced ECC data to the ECC data register contained in the EEPROM; writes both the user data of the user data register and the ECC data of the ECC data register into the user data storage region of the EEPROM and the ECC data storage region thereof at the same addresses; and also reads both the user data and the ECC data stored at the same addresses of the EEPROM so as to perform the error correction.

Furthermore, a mode is desirable in which:

the write control means further includes a user data stack register into which a preselected amount of user data are stored from an external data source, and an ECC data stack register;

the CPU further includes an internal register into which a preselected amount of user data are stored from the external data source;

in a first process cycle, the CPU transfers user data stored at a first address to the user data register contained in the write control means, and stores the user data storage transferred to the user data register into the user data region contained in the EEPROM;

in a next process cycle and succeeding process cycles, the CPU produces ECC data from a predetermined amount of user data stored in the preceding process cycle; transfers the produced ECC data to the ECC data stack register contained in the write control means; transfers the user data to the user data stack register contained in the EEPROM and also the ECC data to the ECC data register; decrements a write address by 1 with respect to the ECC data storage region of the EEPROM; and writes both the user data stored in the user data register and the ECC data stored in the ECC data register into both the user data storage region and the ECC data storage region of the EEPROM, respectively; and also repeatedly executes the above-defined process operations thereof;

in a final process cycle, the CPU produces ECC data from a predetermined amount of user data stored in the preceding process cycle; transfers the produced ECC data to the ECC data stack register contained in the write control means; transfers the produced ECC data to the ECC data register contained in the EEPROM; decrements a write address by 1 with respect to the ECC data storage region of the EEPROM; and writes the ECC data stored in the ECC data storage region of the EEPROM;

the CPU reads both the user data and the ECC data stored at the same addresses of the EEPROM so as to sequentially execute the error corrections.

Furthermore, it is preferable that the write control means further includes a user data stack register into which a preselected amount of user data are stored from an external data source, and an ECC data stack register;

the CPU further includes an internal register into which a preselected amount of user data are stored from the external data source;

in a first process cycle, the CPU transfers user data stored at a first address to the user data register contained in the write control means, and stores the user data transferred to the user data register into the user data storage region contained in the EEPROM;

in a next process cycle and succeeding process cycles, the CPU produces ECC data from a predetermined amount of user data stored in the preceding process cycle; transfers the produced ECC data to the ECC data stack register contained in the write control means; transfers the user data to the user data stack register contained in the EEPROM and also the ECC data to the ECC data register; and writes both the user data stored in the user data register and the ECC data stored in the ECC data register into both the user data storage region and the ECC data storage region of the EEPROM, respectively; and also repeatedly executes the above-defined process operations thereof;

in a final process cycle, the CPU produces ECC data from a predetermined amount of user data stored in the preceding process cycle; transfers the produced ECC data to the ECC data stack register contained in the write control means; transfers the produced ECC data to the ECC data register contained in the EEPROM; and writes the ECC data stored in the ECC data region of the EEPROM; and also reads both user data of the EEPROM and ECC data stored at an address incremented by 1 from an address of the read user data so as to sequentially execute the error correction.

With the above-described one-chip microcomputer, the user data are externally inputted, the CPU sequentially produces the ECC data from a preselected amount of entered user data in accordance with the internal program, and thereafter both the user data and the produced ECC data corresponding thereto are stored into the user data storage region and the ECC data storage region of the EEPROM. As a consequence, the workload given to the user can be greatly reduced, as compared with the user workload in such a case that the ECC data is produced outside the one-chip microcomputer. Furthermore, since such an external memory for temporarily storing thereinto the produced ECC data is no longer required so as to produce the ECC data, the entire system cost can be lowered. In addition, since both the user data and the ECC data are written into EEPROM at the same time, the data writing time with respect to EEPROM can be reduced, as compared with the data writing time required when the ECC data is written from the external memory into this EEPROM.

BRIEF DESCRIPTION OF THE DRAWINGS

The above and further objects, advantages and features of the present invention will be more apparent from the following description taken in conjunction with the accompanying drawings, in which:

FIG. 19 indicates a timing chart when the fourth operation is carried out during writing operation; and FIG. 20 is an explanatory diagram for explaining the conventional ECC data producing/adding method executed in EEPROM.

DESCRIPTION OF THE PREFERRED EMBODIMENTS

Referring to drawings, various preferred embodiments of the present invention will be described more in detail.

Before describing an one-chip microprocessor according to an embodiment of the present invention, contents of drawings related to this one-chip microprocessor will be explained in detail.

Figure 1:
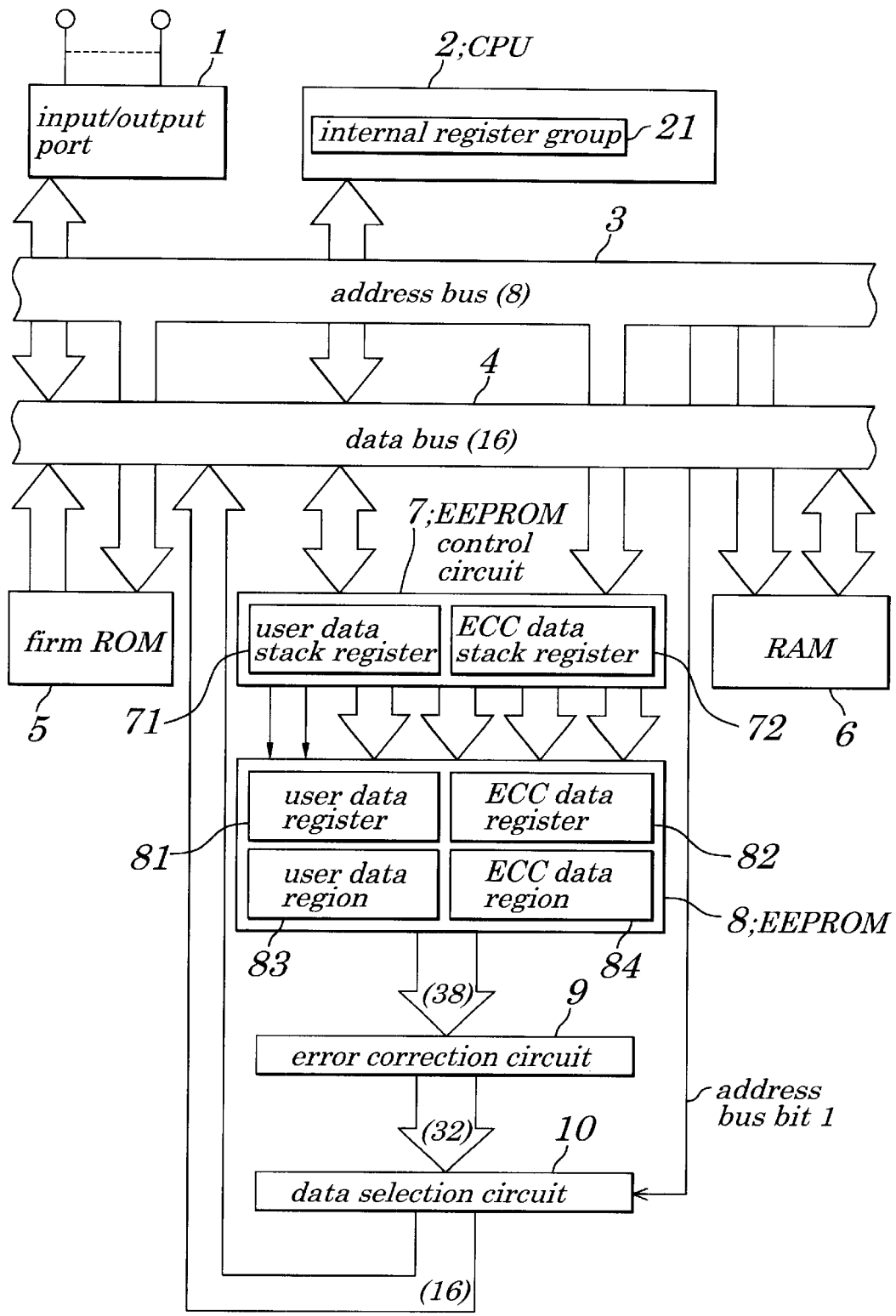
FIG. 1 schematically shows a circuit block diagram of an one-chip microcomputer according to an embodiment of the present invention.
Figure 2:
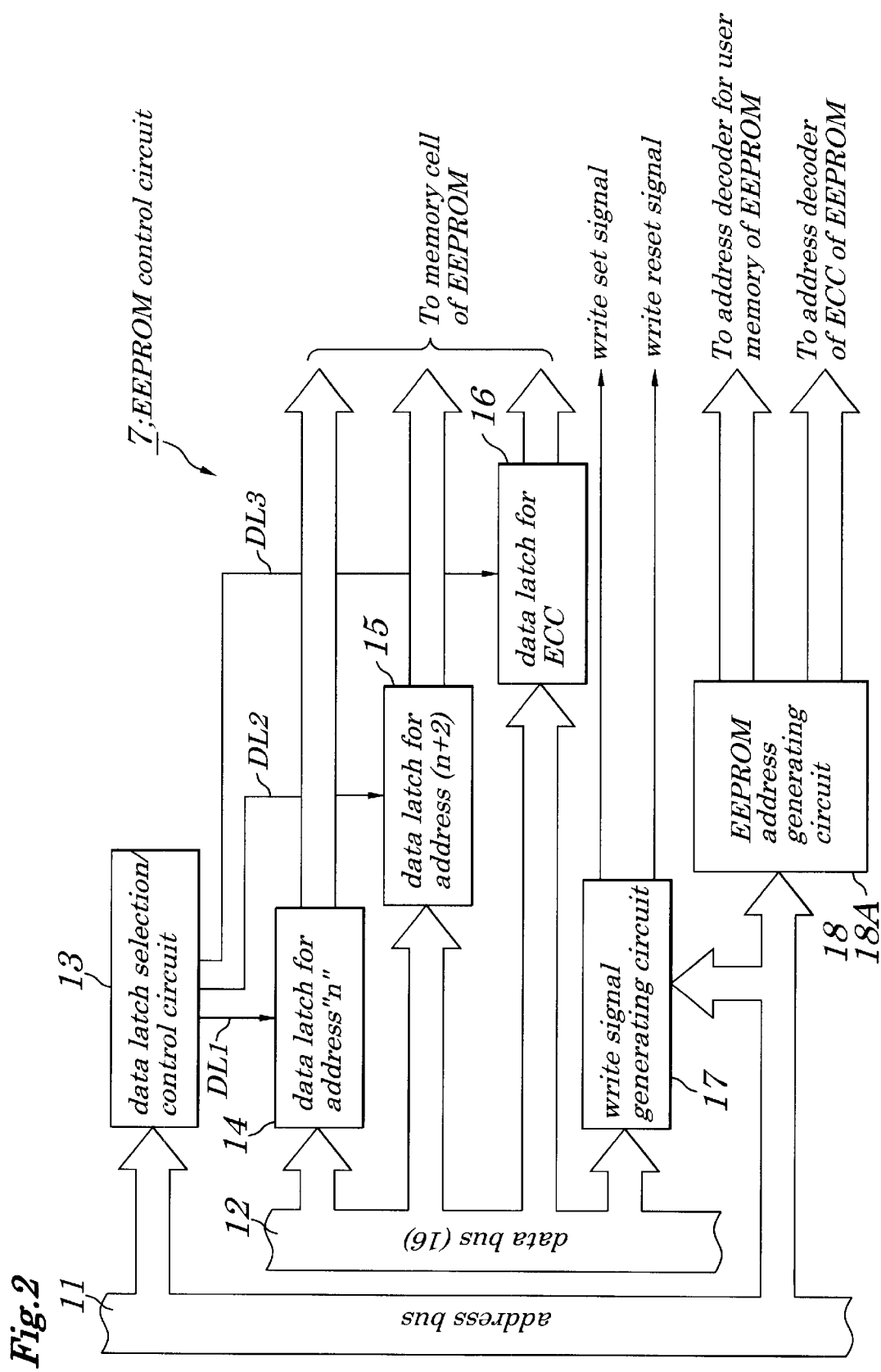
FIG. 2 schematically represents a circuit block diagram of an EEPROM control circuit employed in the one-chip microcomputer of FIG. 1.
Figure 3:
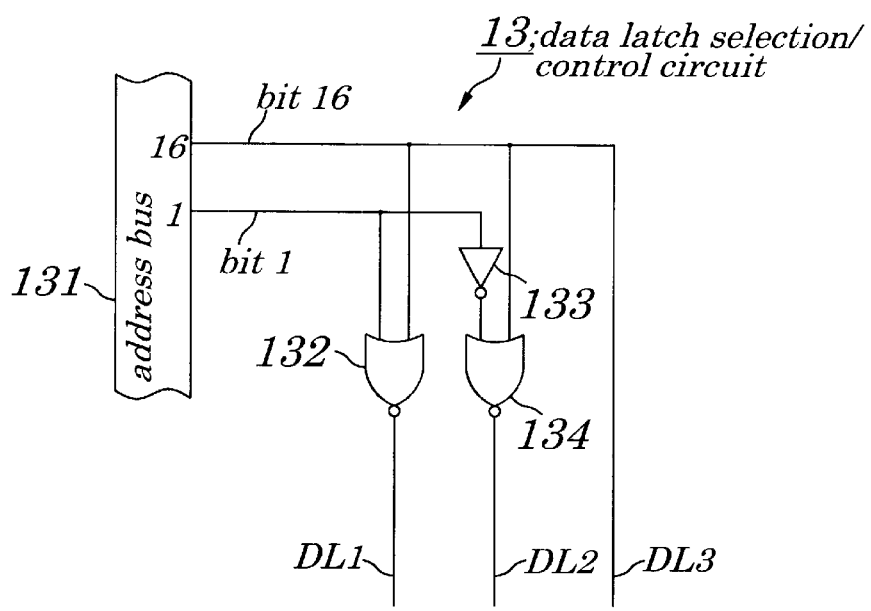
FIG. 3 schematically indicates a circuit block diagram of a data latch selection/control circuit employed in the one-chip microcomputer of FIG. 1.
Figure 4:
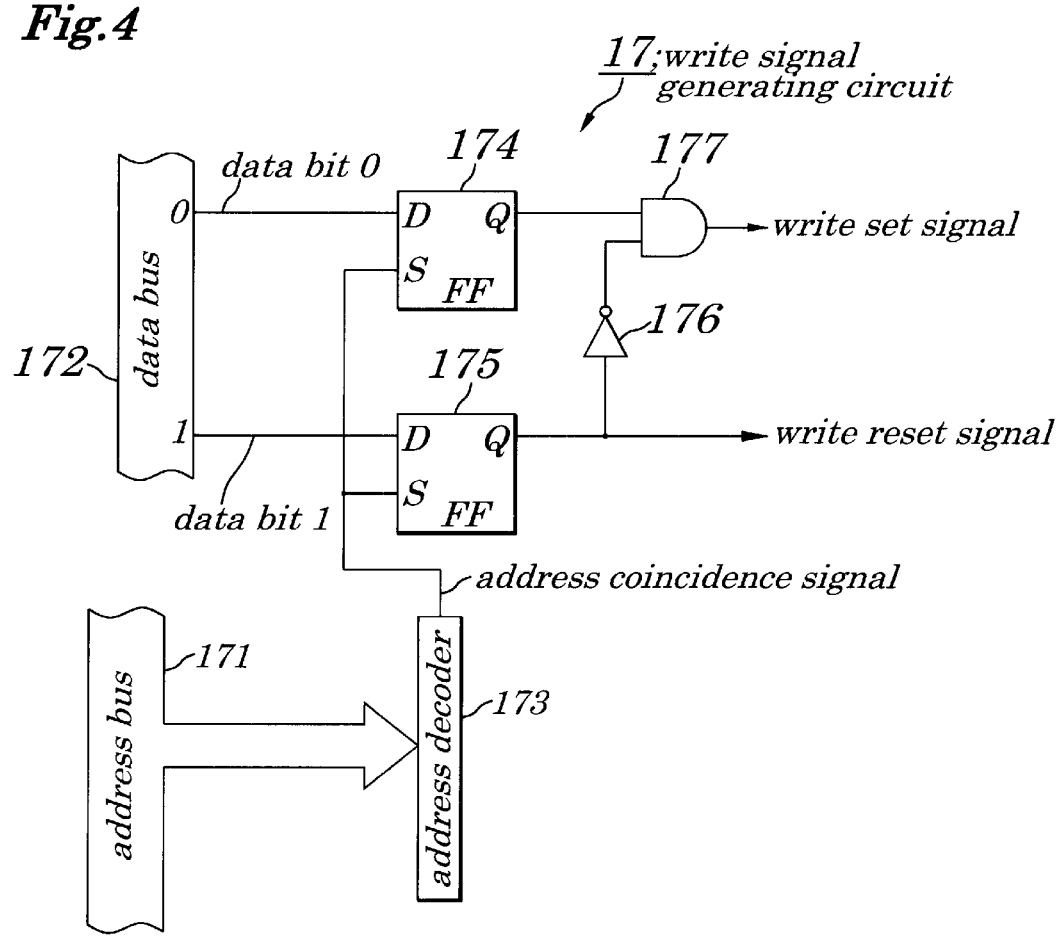
FIG. 4 schematically shows a circuit block diagram of a write signal generating circuit employed in the one-chip microcomputer of FIG. 1.
Figure 5:
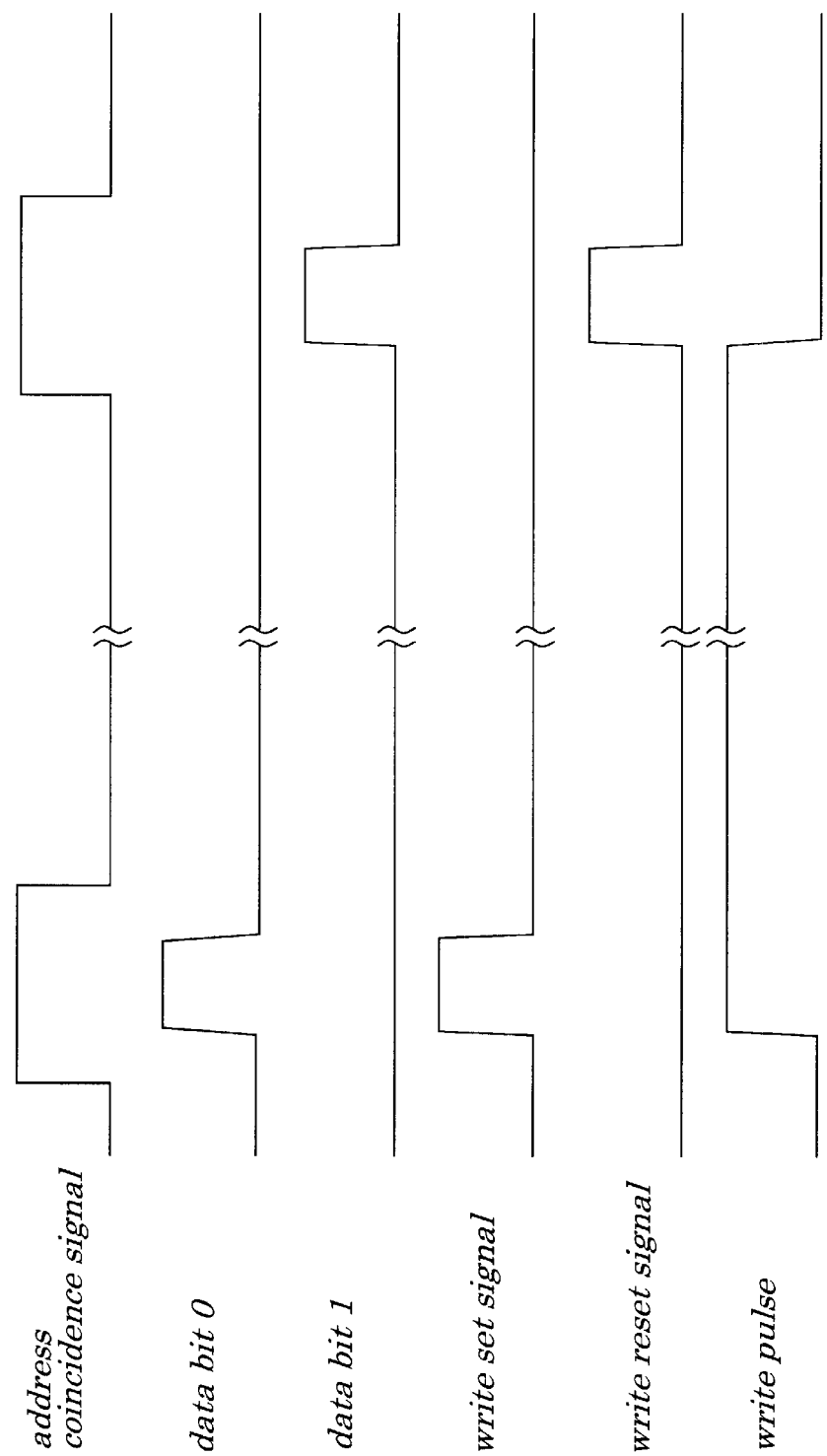
FIG. 5 represents an operation timing chart of the write signal generating circuit.
Figure 6:
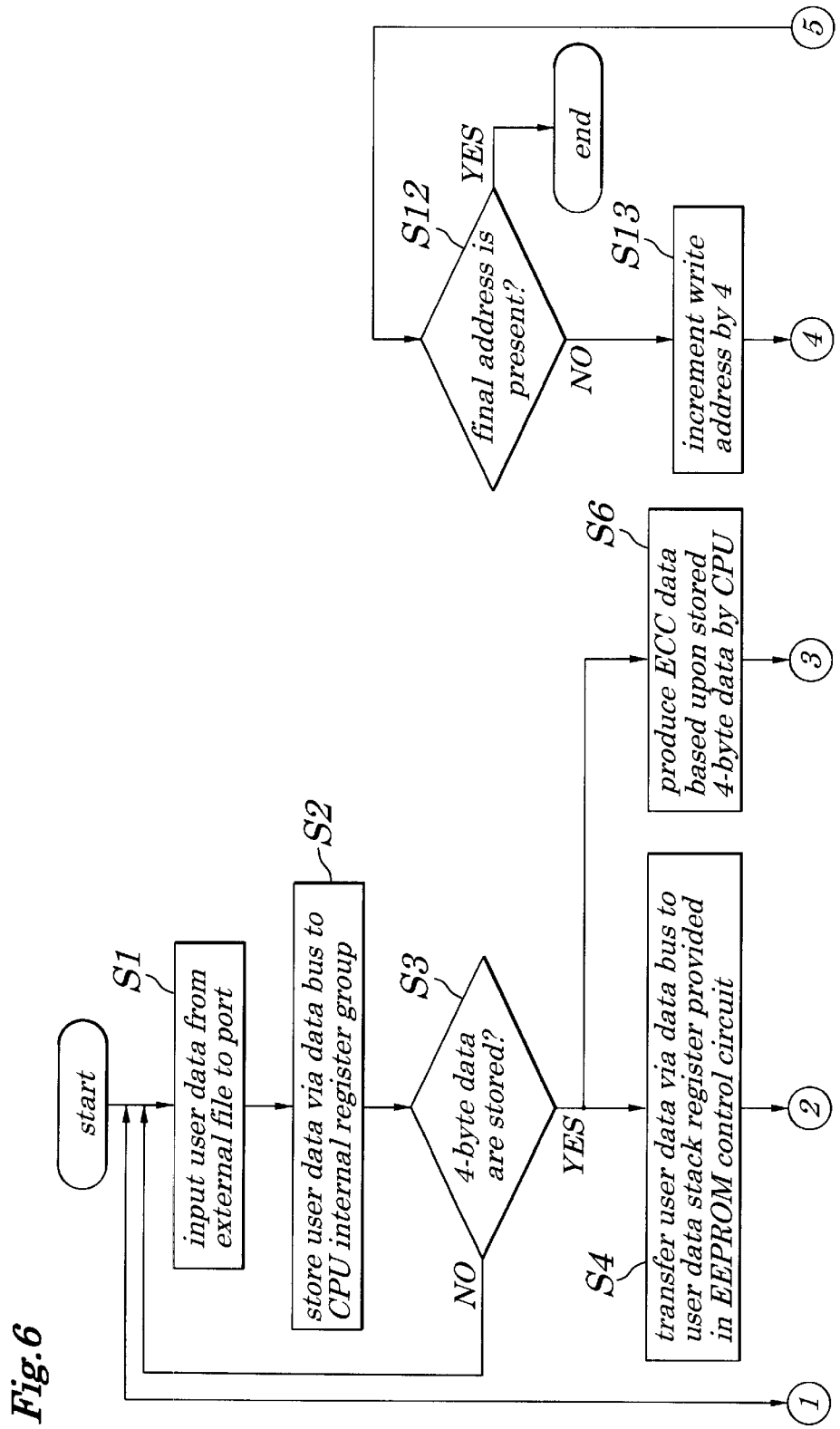
FIG. 6 is a flow chart for describing a first operation process sequence of the one-chip microcomputer shown in FIG. 1.
Figure 7:
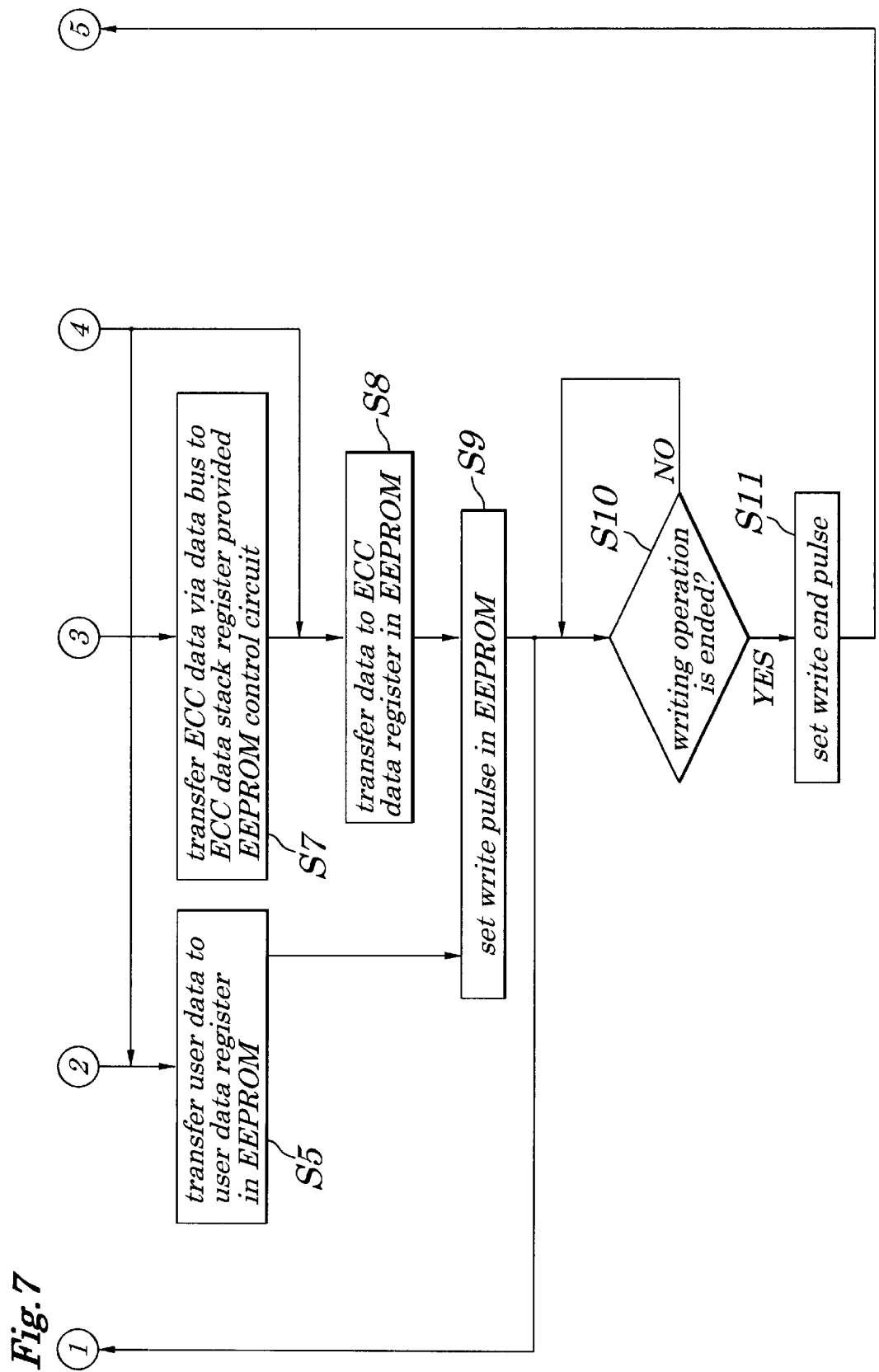
FIG. 7 is a flow chart for describing the first operation process sequence of the one-chip microcomputer shown in FIG. 1.
Figure 8:
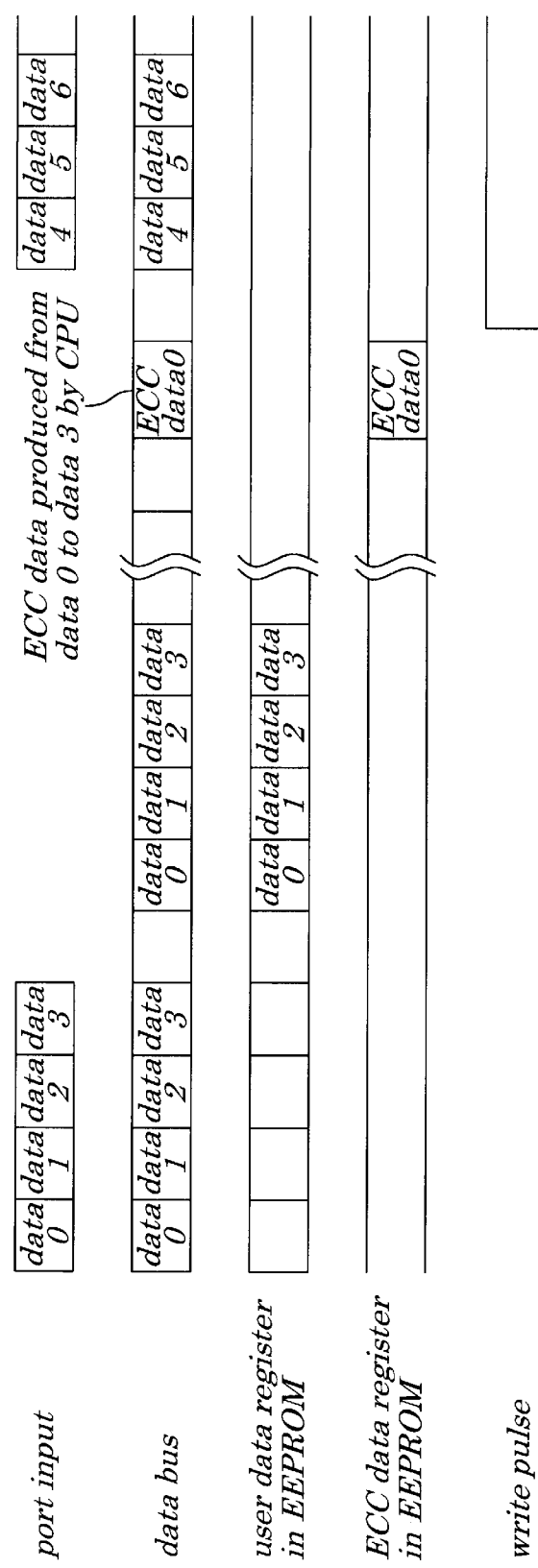
FIG. 8 represents a timing chart during writing operation in a first operation example.
Figure 9:
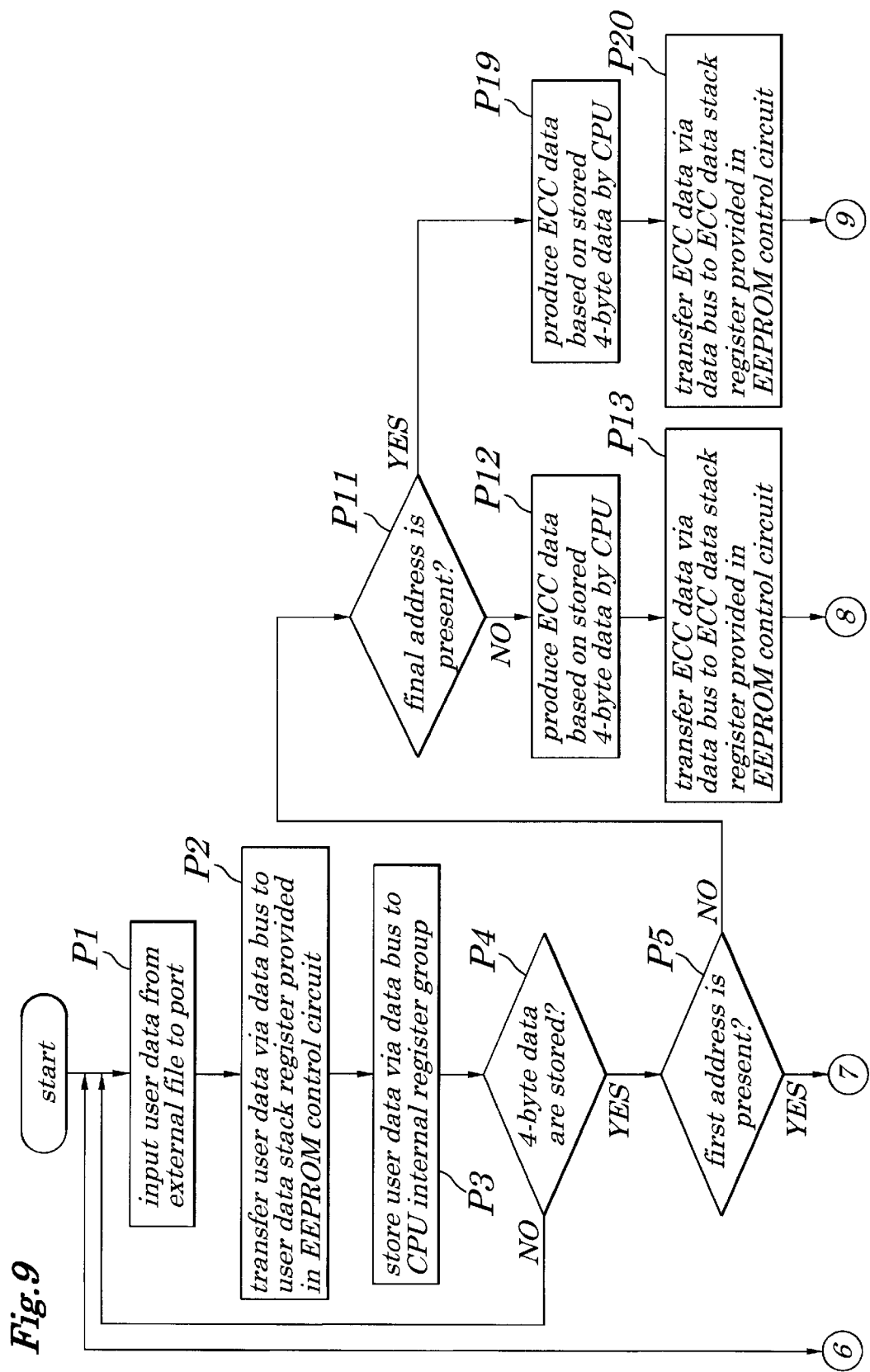
FIG. 9 is a flow chart for explaining a second operation process sequence of the one-chip microcomputer indicated in FIG. 1.
Figure 10:
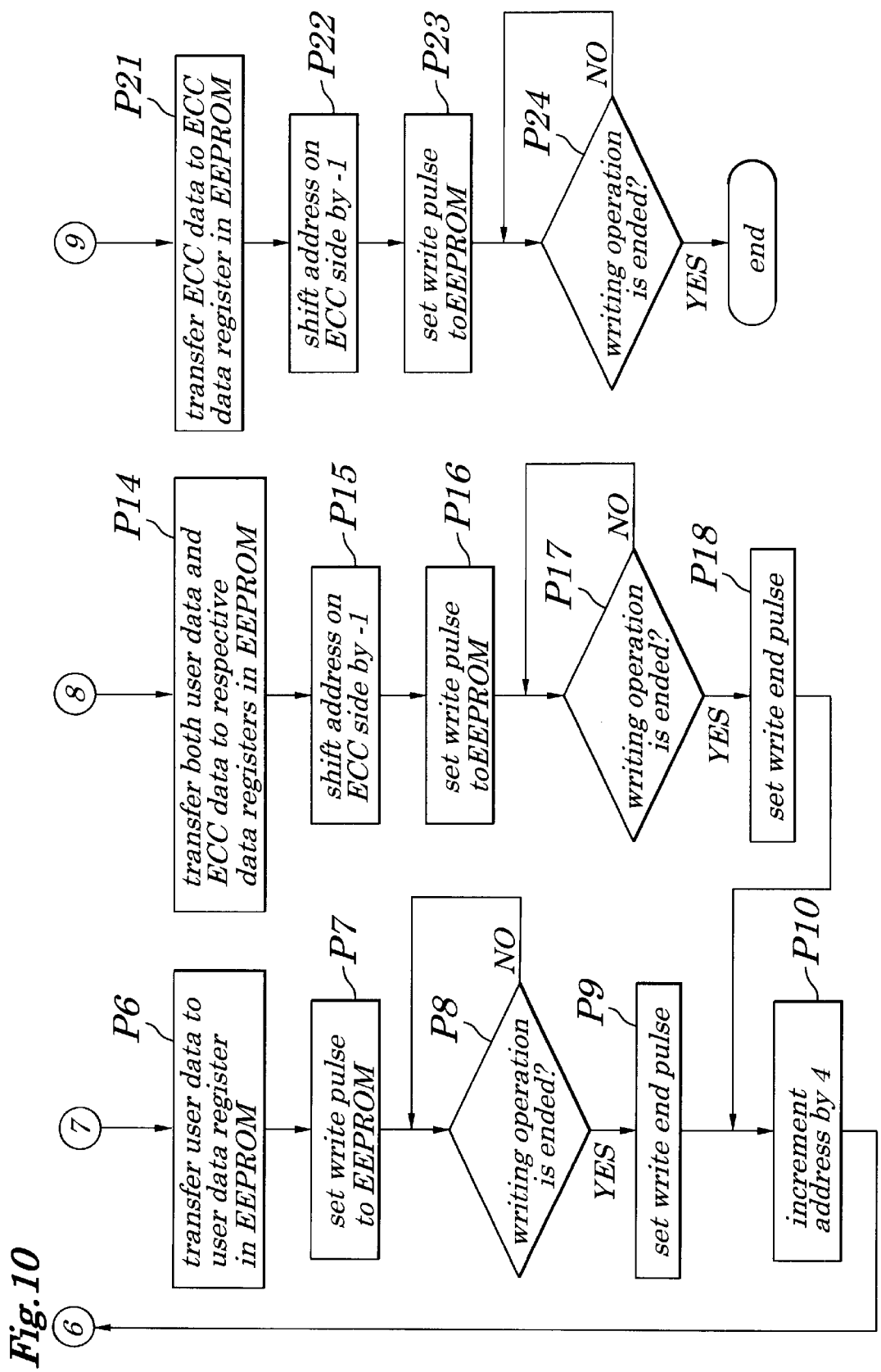
FIG. 10 is a flow chart for explaining the second operation process sequence of the one-chip microcomputer indicated in FIG. 1.
Figure 11:
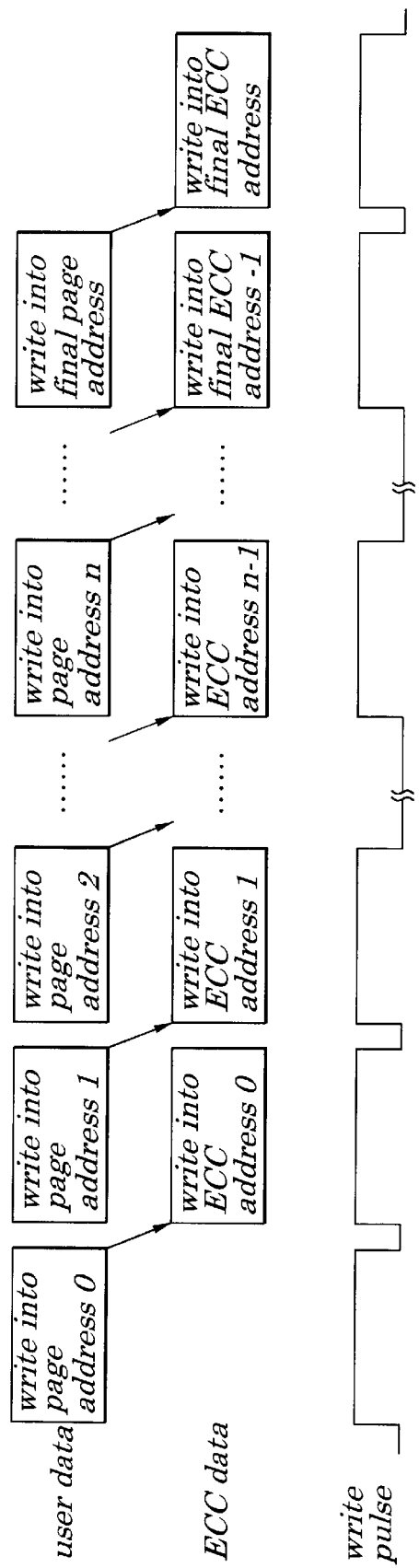
FIG. 11 represents a timing chart when an ECC address is shifted during writing operation.
Figure 12:
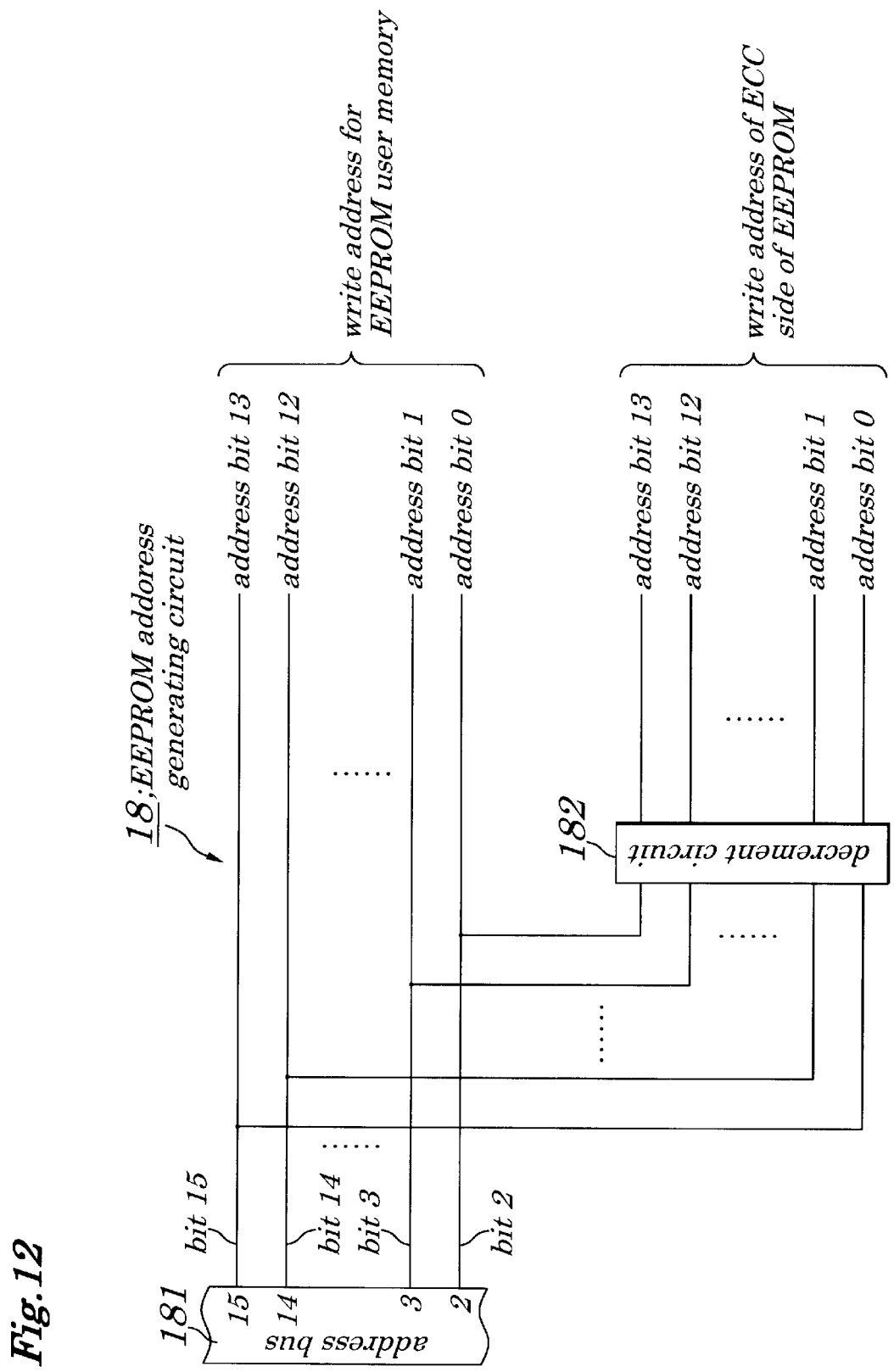
FIG. 12 schematically shows a circuit block diagram of an EEPROM address generating circuit when the ECC address is shifted during writing operation.
Figure 13:
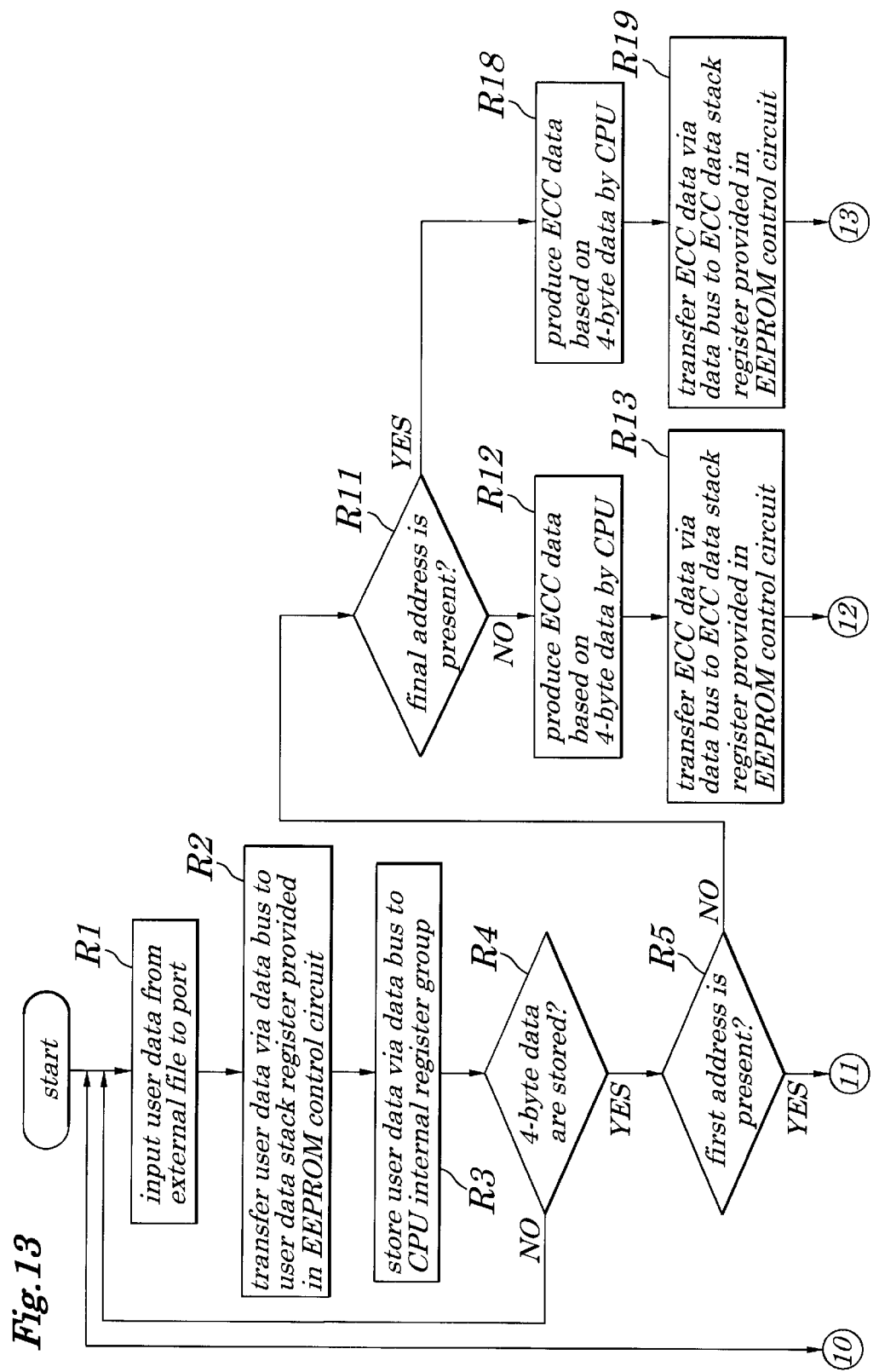
FIG. 13 is a flow chart for explaining a third operation of the one-chip microcomputer indicated in FIG. 1.
Figure 14:
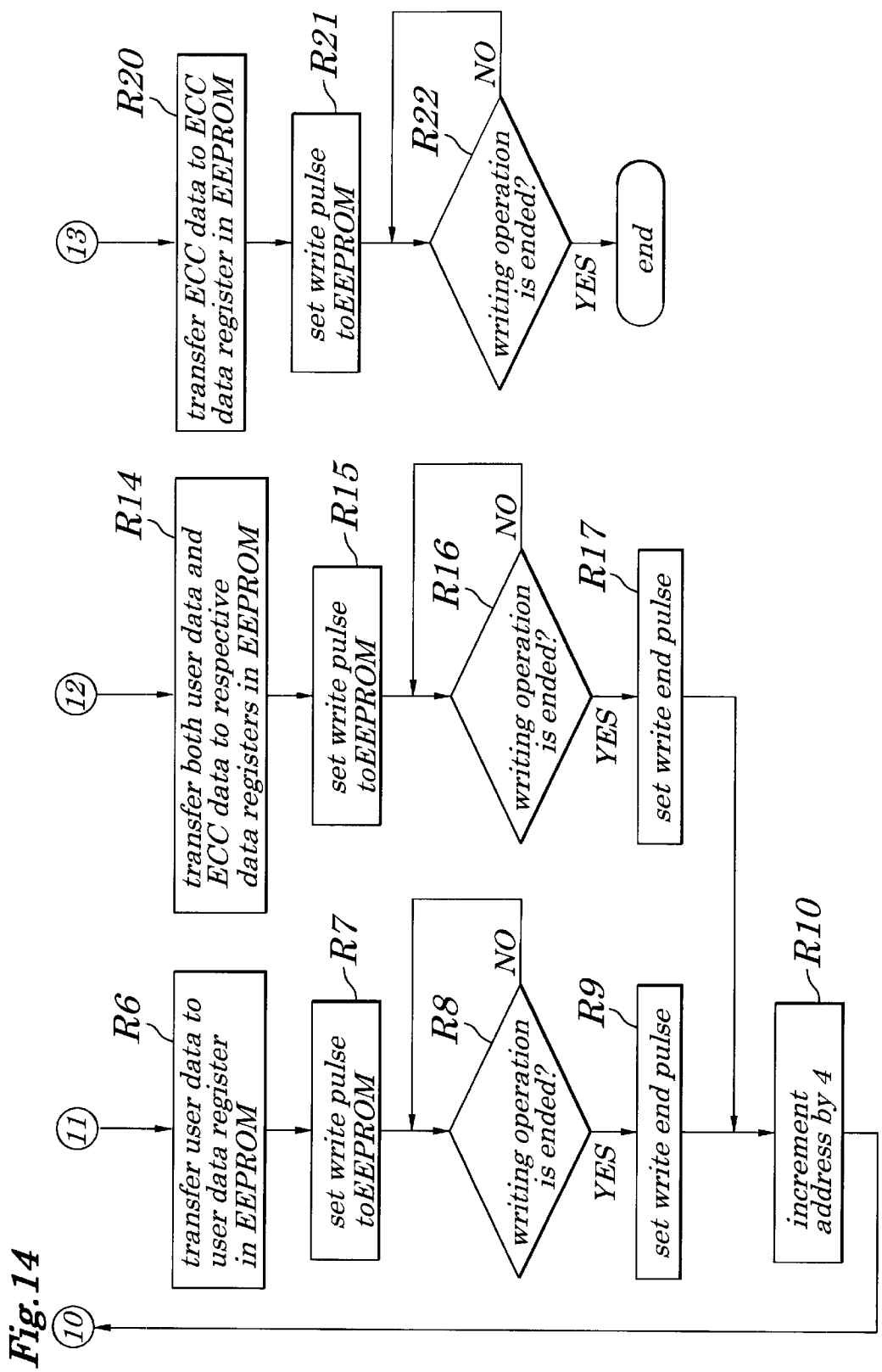
FIG. 14 is a flow chart for explaining the third operation of the one-chip microcomputer indicated in FIG. 1.
Figure 15:
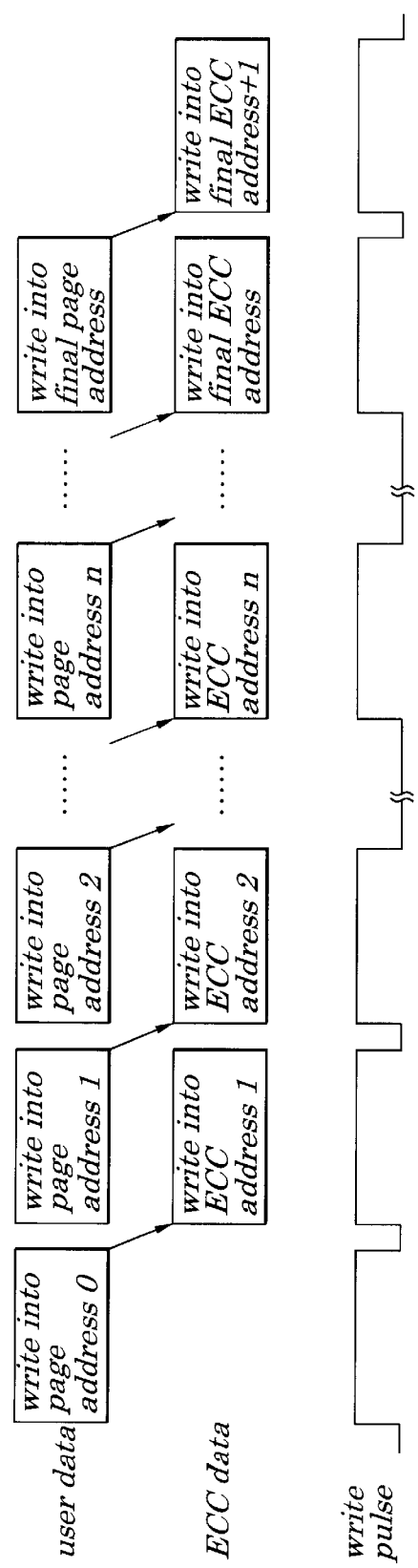
FIG. 15 represents a timing chart when an ECC address is shifted during the reading operation.
Figure 16:
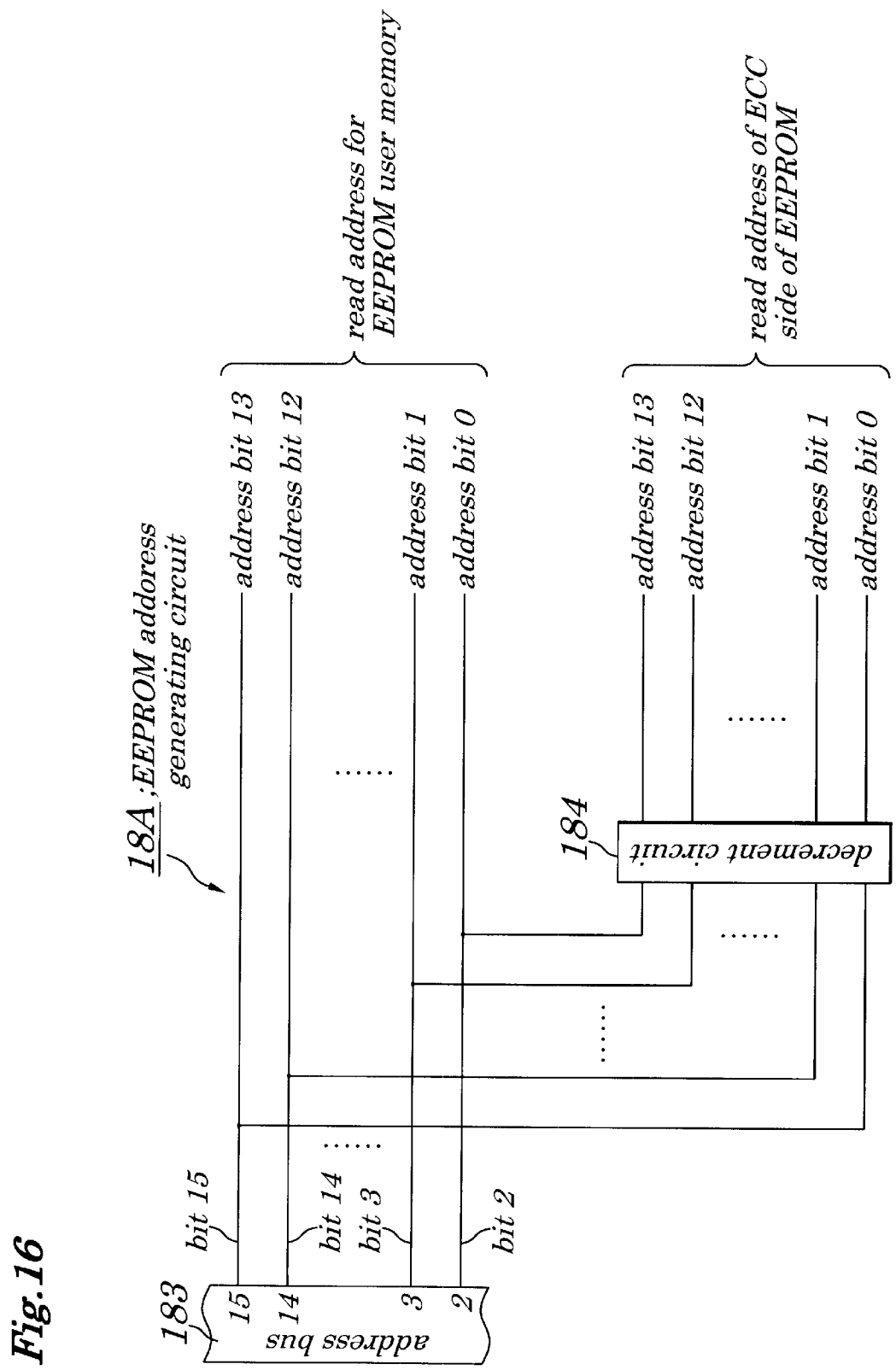
FIG. 16 schematically shows a circuit block diagram of an EEPROM address generating circuit when the ECC address is shifted during reading operation.
Figure 17:
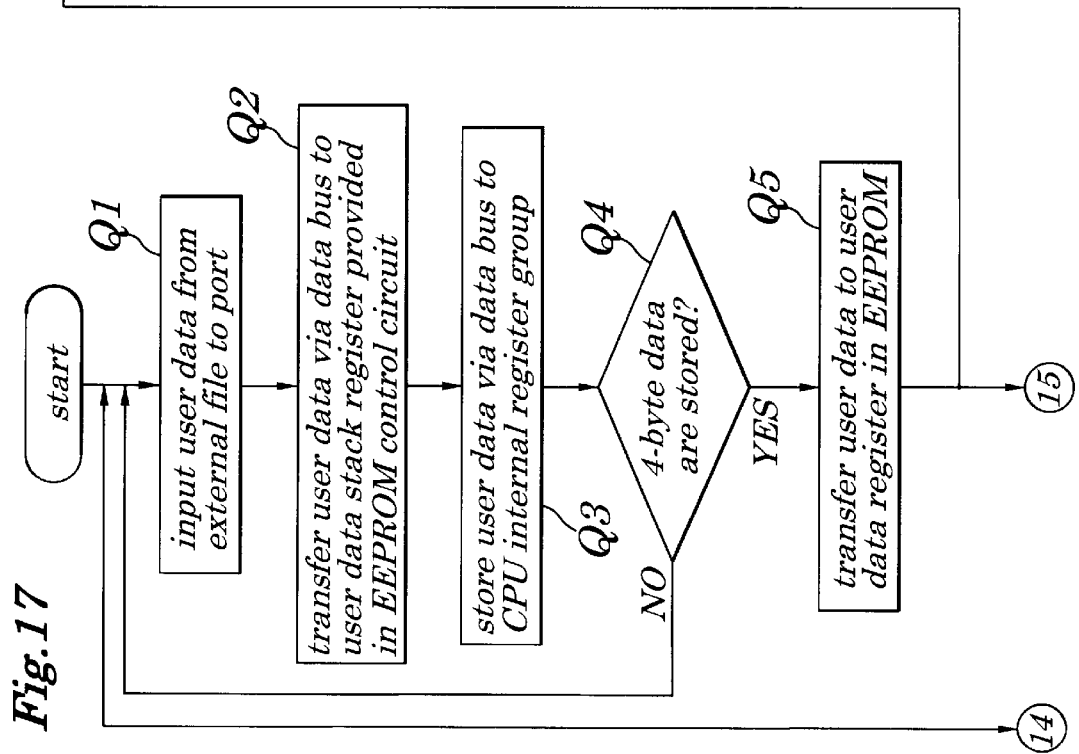
FIG. 17 is a flow chart for explaining a fourth operation of the one-chip microcomputer indicated in FIG. 1.
Figure 18:
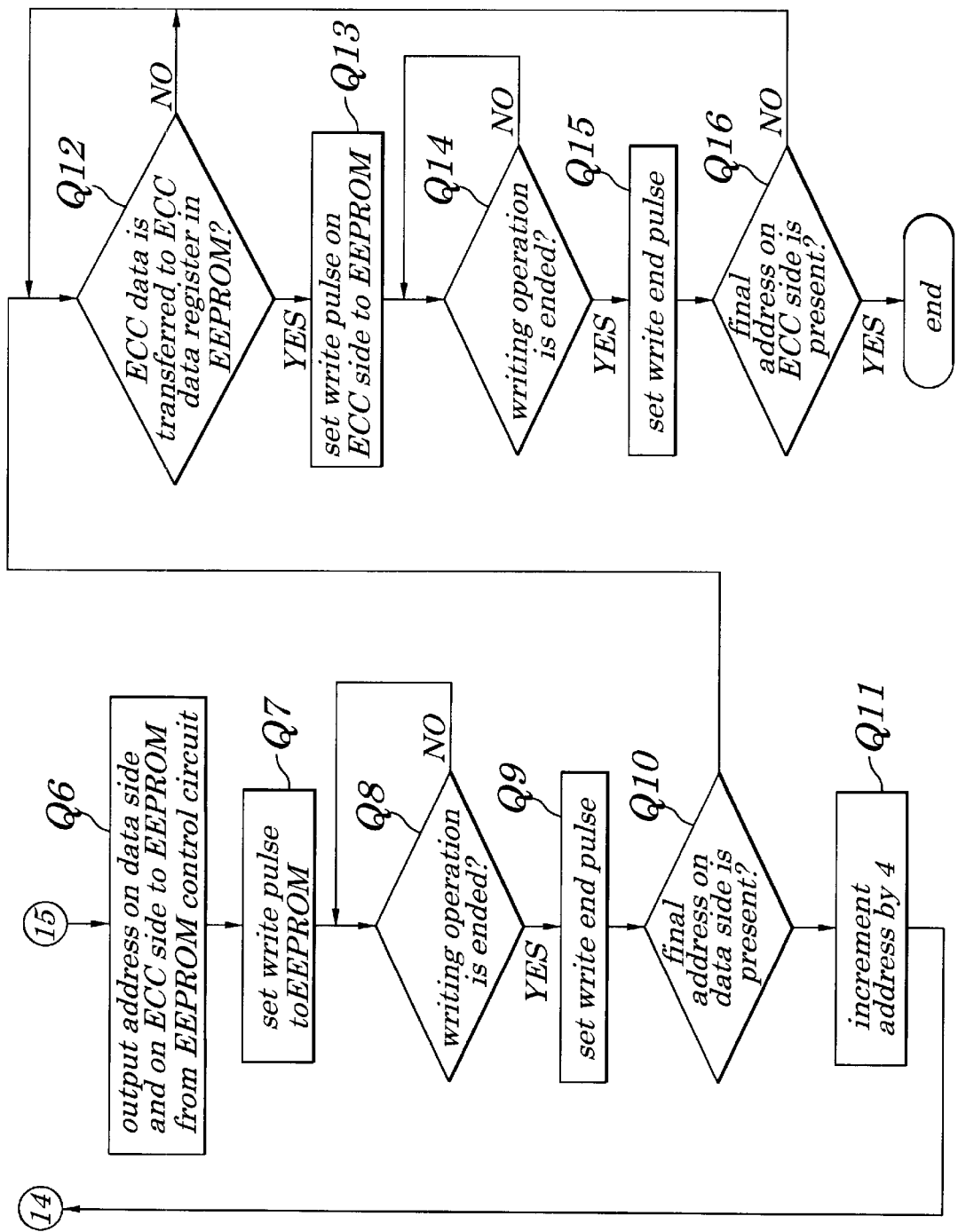
FIG. 18 is a flow chart for explaining the fourth operation of the one-chip microcomputer indicated in FIG. 1.

FIG. 1 schematically shows a circuit block diagram of an one-chip microcomputer according to an embodiment of the present invention. FIG. 2 schematically represents a circuit block diagram of an EEPROM control circuit employed in the one-chip microcomputer of FIG. 1. FIG. 3 schematically indicates a circuit block diagram of a data latch selection/control circuit employed in the one-chip microcomputer of FIG. 1. FIG. 4 schematically shows a circuit block diagram of a write signal generating circuit employed in the one-chip microcomputer of FIG. 1. FIG. 5 represents an operation timing chart of the write signal generating circuit. FIG. 6 and FIG. 7 are flow charts for describing a first operation process sequence of the one-chip microcomputer shown in FIG. 1. FIG. 8 represents a timing chart during writing operation in a first operation example. FIG. 9 and FIG. 10 are flow charts for explaining a second operation process sequence of the one-chip microcomputer indicated in FIG. 1. FIG. 11 represents a timing chart when an ECC address is shifted during writing operation. FIG. 12 schematically shows a circuit block diagram of an EEPROM address generating circuit when the ECC address is shifted during writing operation. FIG. 13 and FIG. 14 are flow charts for explaining a third operation of the one-chip microcomputer indicated in FIG. 1. FIG. 15 represents a timing chart when an ECC address is shifted during reading operation. FIG. 16 schematically shows a circuit block diagram of an EEPROM address generating circuit when the ECC address is shifted during reading operation. FIG. 17 and FIG. 18 are flow charts for explaining a fourth operation of the one-chip microcomputer indicated in FIG. 1. FIG. 19 indicates a timing chart when the fourth operation is carried out during writing operation.

Overall Arrangement of One-chip Microcomputer

As indicated in FIG. 1, the one-chip microcomputer of this embodiment of the present invention is mainly arranged by an input/output port 1, a CPU (central processing unit) 2, an address bus 3, a data bus 4, a firm ROM (read-only memory) 5, a ROM (random access memory) 6, an EEPROM (electrically erasable programmable ROM) 8, an EEPROM control circuit 7, an error correction circuit 9, and a data selection circuit 10.

The input port 1 is constituted by a plurality of terminal ports for inputting/outputting data between this one-chip microcomputer and an external device. The CPU 2 controls an overall operation of the one-chip microcomputer according to this embodiment by controlling an interpretation of a command and an execution of a command, issued from a program. The address bus 3 is used to transfer an address signal among various circuit portions within this one-chip microcomputer. The firm ROM 5 stores thereinto firmware (namely, microprogram) required to operate this one-chip microcomputer. In this embodiment, this firm ROM 5 stores thereinto an ECC data producing program. The RAM 6 is such a random access memory which is mainly used as a work area of the CPU 2.

The EEPROM control circuit 7 is such a control circuit for controlling read/write operations of the EEPROM 8. This EEPROM control circuit 7 contains a content (will be discussed later), and includes a user data stack register 71 and an ECC data stack register 72 so as to stack data. The EEPROM 8 corresponds to a fixing storage element for electrically writing/erasing information. This EEPROM 8 contains both a user data register 81 and an ECC data register 82 in order to write thereinto data, and furthermore, contains both a user data region 83 and an ECC data region 84 so as to store thereinto data. It should be noted that this EEPROM 8 may be realized by either the normal EEPROM or a flash EEPROM.

The error correction circuit 9 corrects an error contained in data by detecting this data error based upon ECC (error correction code) data added to the data. The data selection circuit 10 subdivides 32-bit data outputted from the error correction circuit 9 into upper-graded 16-bit data and lower-graded 16-bit data, and then, alternately transfers these 16-bit data to the data bus 4.

Internal Arrangement of EEPROM Control Circuit 7

As shown in FIG. 2, the above-described EEPROM control circuit 7 is arranged by employing an address bus 11, a data bus 12, a data latch selection/control circuit 13, a data latch 14 for an address "n", a data latch 15 for an address "n+2", a data latch 16 for ECC data, a write signal generating circuit 17, and an EEPROM address generating circuit 18. In this case, the following description is made while using an address "n" of externally supplied user data as a reference. The address bus 11 constitutes a portion of the above-explained address bus 3, and transfers an address signal. The data bus 12 constitutes a portion of the above-explained data bus 4, and transfers a data signal. The data latch selection/control circuit 13 produces control signals DL1, DL2, DL3 in accordance with information of the address bus 11. These control signals DL1, DL2, and DL3 are used to selectively latch data appearing on the data bus 12 by the data latch 14 for the address "n", the data latch 15 for the address "n+2", and the data latch 16 for the ECC. An internal arrangement of this data latch selection/control circuit 13 will be explained later. The data latch 14 for the address "n" latches 2-byte (16 bits) data of both the address "n" and the address (n+1) on the data bus 12 when the control signal DL1 becomes active, and latches data to thereby output the latched data to the memory of the EEPROM 8 in the case that a bit 1 of an address is equal to "0".

The data latch 15 for the address "n+2" latches 2-byte (16 bits) data of both the address (n+2) and the address (n+3) on the data bus 12 when the control signal DL2 becomes active, and latches data to thereby output the latched data to the memory of the EEPROM 8 in the case that a bit 1 of an address is equal to "1". The data latch 16 for the ECC latches lower-graded 6-bit data appearing on the data bus 12 when the control signal DL3 becomes active, and latches data to thereby output the latched data to the memory cell of the EEPROM 8 when the ECC address is outputted.

The write signal generating circuit 17 generates both a write set signal and a write reset signal based on both information of the address bus 11 and the information of the data bus 12. This write set signal is used to control a commencement of a writing operation with respect to the EEPROM 8. The write reset signal is used to control a completion of a writing operation with respect to this EEPROM 8. An internal arrangement of this write signal generating circuit 17 will be discussed later. The EEPROM address generating circuit 18 generates an address with respect to the EEPROM 8 based on information of the address bus 11. This EEPROM address generating circuit 18 applies bits 2 to 15 of the address bus 11 as addresses 0 to 13 of a data region of the EEPROM 8 via an address decoder (not shown) for a data region (user memory) of this EEPROM 8, and furthermore, applies bits 2 to 15 of the address bus 11 as addresses 0 to 13 of an ECC data region of the EEPROM 8 via a decrement circuit (not shown) and another address decoder (not shown either) of the ECC data region of this EEPROM 8. The reason why such an address conversion is carried out is given as follows. That is to say, the address signal is given in unit of "byte" (8 bits), whereas the least significant bit (LSB) of 2 bits are not required as an address corresponding to 32-bit input/output data of the EEPROM 8. It should also be noted that since data has a 16-bit width, the data latch 14 for the address "n" latches both the data of the address "n" and the data of the address (n+1), and also the data latch 15 for the address (n+2) latches both the data of the address (n+2) and the data of the address (n+3) with respect to the external address "n".

Internal Arrangement of Data Latch Selection/Control Circuit 13

As indicated in FIG. 3, the above-explained data latch selection/control circuit 13 is arranged by employing an address bus 131, an NOR gate circuit 132, an inverter 133, and another NOR gate circuit 134.

The address bus 131 constitutes a portion of the address bus 11, and transfers an address signal. The NOR gate circuit 132 outputs the control signal DL1 with respect to the data latch 14 for the address "n" when both the bit 1 of the address bus 131 indicative of the data region of the EEPROM 8 and the bit 16 of the address bus 131 indicative of the ECC data region are inactive. Both the inverter 133 and the NOR gate circuit 134 output the control signal DL2 with respect to the data latch 15 for the address (n+2) when the bit 1 of the address bus 131 indicative of the data region of the EEPROM 8 becomes active and the bit 16 of the address bus 131 indicative of the ECC data region becomes inactive. On the other hand, when the bit 16 of the address bus 131 becomes active, these inverter 133 and NOR gate circuit 134 output the control signal DL3 with respect to the data latch 16 for ECC.

Internal Arrangement/Operation of Write Signal Generating Circuit 17

As represented in FIG. 4, the write signal generating circuit 17 is arranged by containing an address bus 171, a data bus 172, an address decoder 173, a flip-flop (FF) 174, another flip-flop 175, an inverter 176, and an AND gate circuit 177.

Operations of this write signal generating circuit 17 is represented by a timing chart of FIG. 5. The address bus 171 constitutes a portion of the address bus 11, and transfers address signal. The data bus 172 constitutes a portion of the data bus 12, and transfers a data signal. The address decoder 173 outputs an address coincidence signal in such a case that an address on the address bus 171, which is outputted from the CPU 2, is made coincident with a specific address which is previously set and may instruct a generation of a writing signal to the EEPROM 8. When the address coincidence signal is outputted from the address decoder 173, both the flip-flop 174 and the flip-flop 175 latch a data bit 0 and a data bit 1 of the data bus 172, respectively. As a result, a write set signal is outputted from the AND gate circuit 177 under such a condition that a write reset signal is not outputted when the write reset signal is outputted in response to the data bit 1 and the data bit 0 is outputted. In the EEPROM 8, both the user data and the ECC data are written within a time period while a write pulse is active by causing the write pulse to rise by the write set signal and also by causing the write pulse to fall by the write reset signal.

First Operation in EEPROM 8

Referring to FIG. 6, FIG. 7, and FIG. 8, a first operation executed in the EEPROM 8 is explained as follows: That is, the first operation indicates a process method executed in such a case that since a writing operation of EEPROM 8 is performed in a low speed, ECC data can be produced within a width of a write pulse.

It is now assumed that both a first address of user data and a final address of this user data are previously designated in an external file (not shown in detail) for storing therein the user data. After 4-byte data has been stored (step S3) by repeatedly executing such a process operation that the user data is inputted from the first address of the external file into the input/output port 1 (step S1) and then is stored via the data bus 4 into the internal register group 21 of the CPU 2, this user data is transferred from the internal register group 21 via the data bus 4 to the user data stack register 71 provided in the EEPROM control circuit 7 (step S4). Furthermore, this user data is transferred to the user data register 81 provided within the EEPROM 8 (step S5).

On the other hand, the CPU 2 reads out the ECC generation program stored in the firm ROM 5 so as to execute this read ECC generation program, so that this CPU 2 produces the ECC data based on the stored 4-byte data (step S6), and transfers the ECC data via the data bus 4 to the ECC data stack register 72 provided in the EEPROM control circuit 7 (step S7). Furthermore, the CPU 2 transfers this ECC data to the ECC data register 82 provided in the EEPROM 8 (step S8).

Then, the below-mentioned writing process operation is repeatedly carried out until all data contained in the 4-byte data have been completely written (step S10). In this writing process operation, both the user data of the user data register 81 and the ECC data of the ECC data register 82 are written into the user data region 83 of EEPROM 8 and the ECC data region 84 thereof by supplying the write set signal from the EEPROM control circuit 7 to the EEPROM 8 (step S9). When the writing operation is accomplished, the write reset signal is supplied to EEPROM 8 (step S11).

When the process operation for the 4-byte data is accomplished, the address of the user data is incremented by 4 (step S13), and thereafter, the process operations defined at the steps S5 and S8 are again repeated. Then, when the final address appears (step S12), this process operation is accomplished.

The write timing of the respective data processed in this case is represented in a timing chart of FIG. 8. In other words, first of all, since the 4-byte data is entered from the port 1 as write data (data "0" to data "3"), this write data is continuously outputted to the data bus 4. When this write data is transferred to the user data register 81 provided in EEPROM 8 at predetermined timing, and furthermore, the generation of the ECC data from the data "0" to the data "3" is accomplished in CPU 2 and then this ECC data is transferred to the ECC data register 82 provided in EEPROM 8, a write pulse is generated and then is written into EEPROM 8.

When data stored in this EEPROM 8 is read, since both the user data and the ECC data are read at the same address, both the corresponding user data portion and the corresponding ECC data portion can be read out from this EEPROM 8. As a result, the error correction can be carried out by the error correction circuit 9.

Second Operation in EEPROM 8

Subsequently, a second operation executed in the EEPROM 8 will now be described with reference to FIG. 9, FIG. 10, FIG. 11, and FIG. 12. That is, this second operation indicates a process method executed in such a case that since a writing operation of EEPROM 8 is performed in a high speed, ECC data cannot be produced within a width of a write pulse, and also an ECC address is shifted during writing operation.

It is now assumed that both a first address of user data and a final address of this user data are previously designated in an external file (not shown in detail) for storing therein the user data. After 4-byte data has been stored (step P4) by repeatedly executing such a process operation that the user data is inputted from the first address of the external file into the input/output port 1 (step P1), and further the user data in transferred via the data bus 4 to the user data stack register 71 provided in the EEPROM control circuit 7 (step P2), and then is stored via the data bus 4 into the internal register group 21 of the CPU 2 (step P3), this user data is transferred from the user data stack register 71 provided in the EEPROM control circuit 7 to the user data register 81 provided within the EEPROM 8 (step P6) when this 4-byte data corresponds to the first address (step P5) In the case that the write set signal is outputted from the EEPROM control circuit 7 to EEPROM 8 (step P7) so as to write the user data into this EEPROM 8, and thereafter the writing operation is accomplished (step P8), the write reset signal is outputted from the EEPROM control circuit 7 to EEPROM 8 (step P9). Next, the address is incremented by 4 (step P10), and then the process operation is again returned to the step P1. The process operation after the 4-byte data is inputted from the external file is repeatedly carried out. In the case that when the storage operation of the above-explained 4-byte data is completed, the address does not correspond to the first address (step P5), but also not correspond to the final address (step P11), CPU 2 executes the below-mentioned operations. This CPU 2 produces ECC data from the 4-byte data which has been stored in the previous process cycle (step P12); transfers the ECC data via the data bus 4 to the ECC data stack register 72 provided in the EEPROM control circuit 7 (step P13); and also transfers the user data from the user data stack register 71 to the user data register 81 provided in the EEPROM 8. Further, the CPU 2 transfers the ECC data from the ECC data stack register 72 to the ECC data register 82 (step P14); shifts the address of the ECC data region of EEPROM 8 by "−1" (step P15); outputs the write set signal to EEPROM 8 (step P16); writes the user data from the user data register 81 to the user data region 83 of EEPROM 8; and also writes the ECC data from the ECC data register 82 into the ECC data region 84. Then, when the writing operation is accomplished (step P17), this CPU 2 outputs the write reset signal to the EEPROM 8 (step P18). The process operation is returned to the previous step P10 at which the CPU 2 shifts the address by +4 (step P10). Thereafter, the process operation is again returned to the step P1 at which a series of the above-explained process operation is repeatedly carried out by entering 4-byte data from the external file.

When the remaining address is the final address at the step P11, the CPU 2 produces ECC data from the stored 4-byte data (step P19); transfers the ECC data via the data bus 4 to the ECC data stack register 72 provided in the EEPROM control circuit 7 (step P20); and also transfers the ECC data to the ECC data register 82 (step P21); shifts the address of the ECC data region 84 of EEPROM 8 by "−1 (step P22); outputs the write set signal to EEPROM 8 (step P23); and also writes the ECC data. Then, when the writing operation is ended (step P24), the process operation is accomplished.

FIG. 11 represents various write timing of the respective data in such a case that the ECC address is shifted during the writing operation. In other words, the user data are sequentially transferred from the port 1 to the user data register 81 provided in EEPROM 8 in a unit of a 4-byte page in the address sequence from the page address 0, 1, 2, - - - , n, - - - , final address. The corresponding ECC data which are produced based on the user data with having a 1 cycle delay are successively shifted by 1 address, and then, the address-shifted ECC data are transferred to the ECC data register 82 of EEPROM 8. In response to the write pulse, these address-shifted ECC data are written into the user data region 83 of EEPROM 8 and also into the ECC data region 84 thereof.

In the case that the data stored in EEPROM 8 is read out so as to execute the error correction process operation, both the user data and the ECC data are read out from the same address of this EEPROM 8, so that both the user data portion corresponding thereto and the ECC data portion corresponding thereto can be simultaneously read out.

Internal Arrangement of EEPROM Address Generating Circuit 18

As illustrated in FIG. 12, the EEPROM address generating circuit 18 employed in the EEPROM control circuit 7 in such a case that an ECC address is shifted during a writing operation, is arranged by employing an address bus 181 and a decrement circuit 182.

The address bus 181 constitutes a portion of the address bus 11, and transfers an address signal. The decrement circuit 182 decrements an address of the address bus 181 by 1 to output the decremented address.

Since both 32-bit user data and 6-bit ECC data are written into EEPROM 8 at the same time, bits 2 to 15 of the address bus 181 are applied to addresses 0 to 13 of this EEPROM 8 as write addresses for the user data region 83 of EEPROM 8, whereas the bits 2 to 15 of the address bus 181 are decremented by 1 by way of the decrement circuit 182, and then, the decremented bits are applied to the address 0 to 13 of EEPROM 8 as write addresses for the ECC data region 84 of this EEPROM 8. The reason why such a conversion is carried out is given as follows: That is to say, the least significant bit (LSB) of 2 bits is not required as the address corresponding to the 32-bit input/output data of EEPROM 8, whereas he address signal is provided in the unit of 1 byte (8 bits).

Third Operation in EEPROM 8

Subsequently, a third operation executed in the EEPROM 8 will now be described with reference to FIG. 13, FIG. 14, FIG. 15, and FIG. 16. That is, this third operation indicates a process method executed in such a case that since a writing operation of EEPROM 8 is performed in a high speed, ECC data cannot be produced within a width of a write pulse, and also an ECC address is shifted during reading operation.

It is now assumed that both a first address of user data and a final address of this user data are previously designated in an external file (not shown in detail) for storing therein the user data. After 4-byte data has been stored (step R4) by repeatedly executing such a process operation that the user data is inputted from the first address of the external file into the input/output port 1 (step R1), and the user data is transferred via the data bus 4 to the user data stack register 71 employed in the EEPROM control circuit 7, and further, the inputted data is stored via the data bus 4 into the internal register group 21 of the CPU 2 (step R4), this user data is transferred from the user data stack register 71 to the user data register 81 provided within the EEPROM 8 (step R6) when this 4-byte data corresponds to the first address (step R5). In the case that the write set signal is outputted from the EEPROM control circuit 7 to EEPROM 8 (step R7) so as to write the user data into this EEPROM 8, and thereafter the writing operation is accomplished (step R8), the write reset signal is out putted from the EEPROM control circuit 7 to EEPROM 8 (step R9) next, the address is incremented by 4 (step R10), and then the process operation is again returned to the step R1. The process operation after the 4-byte data is inputted from the external file s repeatedly carried out.

In the case that when the storage operation of the above-explained 4-byte data is completed, the address does not correspond to the first address (step R5), but also not correspond to the final address (step R11), CPU 2 executes the below-mentioned operations. This CPU 2 produces ECC data from the stored 4-byte data (step R12); transfers the ECC data via the data bus 4 to the ECC data stack register 72 provided in the EEPROM control circuit 7 (step R13); and also transfers the user data from the user data stack register 71 to the user data register 81 provided in the EEPROM 8. Further, the CPU 2 transfers the ECC data from the ECC data stack register 72 to the ECC data register 82 (step R14); outputs the write set signal to EEPROM 8 (step R15); writes the user data from the user data register 81 to the user data region 83 of EEPROM 8; and also writes the ECC data from the ECC data register 82 into the ECC data region 84. Then, when the writing operation is accomplished (step R16), this CPU 2 outputs the write reset signal to the EEPROM 8 (step R17). The process operation is returned to the previous step R10 at which the CPU 2 shifts the address by +4 (step R10). Thereafter, the process operation is again returned to the step R1 at which a series of the above-explained process operation is repeatedly carried out by entering 4-byte data from the external file.

When the remaining address is the final address at the step R11, the CPU 2 produces ECC data from the stored 4-byte data (step R18); transfers the ECC data via the data bus 4 to the ECC data stack register 72 provided in the EEPROM control circuit 7 (step 19); and also transfers the ECC data from the ECC data stack register 72 to the ECC data register 82 (within EEPROM 8 (step R20); and also outputs the write set signal to EEPROM 8 (step R21) so as to execute the writing operation of this ECC data. When thie ECC data writing operation is accomplished (step R22), the process operation is accomplished.

FIG. 15 represents various write timing of the respective data in such a case that the ECC address is shifted during the reading operation. In other words, the user data are sequentially transferred from the port 1 to the user data register 81 provided in EEPROM 8 in a unit of a 4-byte page in the address sequence from the page address 0, 1, 2, - - -, n, - - -, final address. The corresponding ECC data which are produced based on the user data with having a 1 cycle delay are successively transferred to the ECC data register 82 of EEPROM 8. In response to the write pulse, these address-shifted ECC data are written into the user data region 83 of EEPROM 8 and also into the ECC data region 84 thereof, at the same addresses thereof. As a consequence, in this case, the ECC data corresponding to the user data at the page address "n" is written in the ECC data region 84 at the address (n+1) thereof.

In the case that the data stored in EEPROM 8 is read out so as to execute the error correction process operation, both the user data at the address "n" of the user data region 83 and the ECC data at the address (n+1) of the user data region 84 provided in EEPROM are read out. As a result, both the corresponding data portion and the corresponding ECC data portion can be read at the same time.

Internal Arrangement of EEPROM Address Generating Circuit 18A

As illustrated in FIG. 16, the EEPROM address generating circuit 18A employed in the EEPROM control circuit 7 in such a case that an ECC address is shifted during a reading operation, is arranged by employing an address bus 183 and a decrement circuit 184.

The address bus 183 constitutes a portion of the address bus 11, and transfers an address signal. The decrement circuit 184 decrements an address of the address bus 183 by 1 to output the decremented address.

Since both 32-bit user data and 6-bit ECC data are read from EEPROM 8 at the same time, bits 2 to 15 of the address bus 183 are applied to addresses 0 to 13 of this EEPROM 8 as read addresses for the user data region 83 of EEPROM 8, whereas the bits 2 to 15 of the address bus 183 are decremented by 1 by way of the decrement circuit 184, and then, the decremented bits are applied to the address 0 to 13 of EEPROM 8 as read addresses for the ECC data region 84 of EEPROM 8. The reason why such a conversion is carried out is given as follows: That is to say, the least significant bit (LSB) of 2 bits is not required as the address corresponding to the 32-bit input/output data of EEPROM 8, whereas the address signal is provided in the unit of 1 byte (8 bits).

Fourth Operation in EEPROM 8

A fourth operation performed in EEPROM 8 will be explained with reference to FIG. 17, FIG. 17, and FIG. 19. That is to say, this fourth operation indicates a process method executed in such a case that since a writing operation of EEPROM 8 is carried out in a high speed, when ECC data cannot be produced within a width of a write pulse, a write address incrementing function is provided on the side of the ECC data region of this EEPROM 8. This write address incrementing function increments a write address by executing a process operation of the CPU 2 based upon a program stored in the firm ROM 5.

A first address of user data stored in an external file (not shown), and also a final address of this user data are previously designated. After 4-byte data has been stored (step Q4) by repeatedly performing such a process operation that the user data is entered from the first address to the input/output port 1 (step Q1), the user data is transferred via the data bus 4 to the user data stack register 71 provided in the EEPROM control circuit 7 (step Q2), and further the user data transferred from the input/output port 1 is stored through the data bus 4 into the internal register group 21 of the CPU 2 (step Q3), the 4-byte data is transferred from the user data stack register 71 to the user data register 81 provided in this EEPROM 8 (step Q5).

On the other hand, when the first 4-byte data is transferred to the user dat register 81 provided in EEPROM 8 at the step Q5, the 4-byte data is stored into a storage region of the RAM 6 at an address corresponding to the user data stack register 71 via the data bus 4 from the internal register group 21 (step Q6). Then, the 4-byte data is read out via the data bus 4 from the storage region of the RAM 6, which is designated by a user data stack address (step Q7). Accordingly, the CPU 2 repeatedly executes such a process operation that this CPU 2 produces ECC data from the 4-byte data (step Q8); transfers the produced ECC data via the data bus 4 to the ECC data stack register 72 at the corresponding address, provided in the EEPROM control circuit 7 (step Q9); and furthermore, transfers this ECC data to the ECC data register 82 provided in the EEPROM 8, so that the stack address is decremented (step Q11)

Then, the CPU 2 repeatedly performs the following process operation while incrementing the address by 4 (step Q17) That is to say, in this process operation, this CPU 2 outputs both an address of the user data region 83 of EEPROM 8 and an address of the ECC data region 84 from the EEPROM control circuit 7 (step Q12); and also outputs the write set signal to EEPROM 8 (step Q13) so as to execute a writing operation. When the writing operation is accomplished (step Q14), this CPU 2 outputs the write reset signal (step Q15) so as to complete the writing operation.

When the user data becomes the final address (step Q16), the CPU 2 transfers the ECC data from the ECC data stack register 72 to the ECC data register 82 provided in the EEPROM 8. When the ECC data transfer operation is ended (step Q18), the CPU 2 outputs the write set signal (step Q19) so as to execute the writing operation with respect to the ECC data region 84 of EEPROM 8. When the writing operation is completed (step S20), the CPU 2 outputs the write reset signal (step Q21). The above-explained process operations are carried out until the user data becomes the final address of the ECC data region 84 (step Q22), and thereafter the process operation is accomplished.

FIG. 19 represents a write timing chart for the various data when the fourth operation is carried out in EEPROM 8. As shown in this write timing chart, user data are transferred from the input/output port 1 to the user data register 81 provided in EEPROM 8 in a unit of a 4-byte pate in this order of page addresses 0, 1, 2, - - - , n, - - - a final page address, and also, ECC data which are produced based upon these transferred user data are sequentially transferred to the ECC data register 82 provided in this EEPROM 8. While the user data are directly written into the user data region 83 of this EEPROM 8 in response to the write pulse, the ECC data are written in a different manner. That is, the firstly produced ECC data for the ECC address "0" (namely, writing operation (1) and (2)) are not written, because these ECC data are default values caused by the delays in the ECC data production. The ECC data subsequent to the firstly produced ECC data are written into the ECC data region 84 of the EEPROM 8 defined at preselected addresses in response to the writ pulses.

In this fourth operation, if the production of the ECC data by the CPU 2 cannot be carried out until the address used to write the next ECC data is incremented, then this CPU 2 outputs the default value. In this case, the EEPROM control circuit 7 does not execute to write the ECC data into the ECC data region 84 provided in the EEPROM 8. As a default value, for example, all digits of "1" are used until the first ECC data is produced, and subsequently, the preceding ECC data are directly outputted as the default value.

When the data is read out from the EEPROM 8 so as to execute the error correction process operation, both the user data and the ECC data are read out at the same address of this EEPROM 8, so that the corresponding user data portion and the corresponding ECC data portion can be read.

As previously described, in accordance with the one-chip microcomputer of the preferred embodiments, when the ECC data is produced, the ECC data producing process operation is not performed by utilizing the external software, but is carried out by executing the software internally provided in this one-chip microcomputer. As a result, the ECC data is no longer required to be written from the external file into the one-chip microcomputer, and a total amount of externally written data is reduced. Consequently, the errors occurred while the write data are transferred can be reduced and the reliability of these write data can be increased.

Furthermore, since the total amount of data externally written into EEPROM is reduced, the data writing time can be shortened and the productivity of the one-chip microcomputer can be improved.

Also, the memories actually mounted in the external. device, which are employed so as to write the data except for the ECC data into EEPROM, are reduced, as compared with those of the conventional one-chip microcomputer. As a consequence, the total cost for this external device can be reduced.

While the various embodiments of the present invention have been described with reference to the drawings, the present invention is not limited to these embodiments, but may be modified, changed, and substituted without departing from the technical scope and spirit of the invention. For instance, the present inventive idea is not limited to a one-chip microcomputer, but may be applied to other computers with employment of EEPROMs, capable of externally storing a program.

As previously described in detail, in accordance with the present invention, in such a one-chip microcomputer in which while the computer program made of the computer data added with the ECC data is stored in EEPROM, the error correction is carried out when the computer program is read therefrom, the ECC data can be produced inside the one-hip microcomputer. As a consequence, the workload given to the user can be greatly reduced, as compared with the user workload in such a case that the ECC data is produced outside the one-chip microcomputer.

Furthermore, since such an external memory for temporarily storing thereinto the produced ECC data is no longer required so as to produce the ECC data, the entire system cost can be lowered.

In addition, since both the user data and the ECC data are written into EEPROM at the same time, the data writing time with respect to EEPROM can be reduced, as compared with the data writing time required when the ECC data is written from the external memory into this EEPROM.

Different from the conventional one-chip microcomputer in which the ECC data is produced by the ECC data generating circuit arranged by the logic circuits, in the one-chip microcomputer of the present invention, only the firm ROM for producing the ECC data is newly added. As a consequence, the entire chip size of this one-chip microcomputer need not be increased without largely increasing the circuit scale. Also, in accordance with the present invention, the process operation for producing the ECC data is executed only while the computer program is stored into EEPROM, whereas the firm ROM used to execute the ECC data producing process operation is not operated while the normal computer program is executed. Moreover, when the computer program is executed, the error detection/correction process operations are performed by employing the error correction circuit arranged by the logic circuits. As a result, the normal program processing speed is not lowered.

Also, normally, when data are written into an EEPROM, data writing time thereof necessarily become several hundreds to several thousands, as compared with that required in a RAM. To the contrary, according to the present invention, the user data received from the external device are combined with each other in unit of plural bytes, and then the combined user data is written into the EEPROM. Also, the user data combined in unit of plural bytes is further combined with the ECC data, and then the result and data is written into the EEPROM. As a consequence, the user data can be received in high speeds, and furthermore, the ECC data can be calculated while utilizing the writing time in the parallel manner.

It is thus apparent that the present invention is not limited to the above embodiments but may be changed and modified without departing from the scope and spirit of the invention.

Finally, the present application claims the priority of Japanese Patent Application No.Hei10-097287 filed on Apr. 9, 1998, which is herein incorporated by reference.

what is claimed is:

1. A one-hip microcomputer comprising:
an electrically erasable memory for temporarily storing thereinto externally supplied user data;
a program storage memory for previously storing thereinto a program; and
a CPU (Central Processing Unit) for reading said program from said program storage memory causing said CPU to produce ECC (Error Correction Code) data based upon said temporarily stored user data in accordance with said program, and for storing said temporarily stored user data and said produced ECC data in said electrically erasable memory at the same time and using the same address to enable sequential correction of errors contained in said temporarily stored user data.

2. A microcomputer according to claim 1 wherein:
when said externally supplied user data contains a 1-bit error, said CPU corrects said 1-bit error based on the produced ECC data read from said electrically erasable memory, whereas when said externally supplied user data contains more than 2-bit errors, said CPU indicates an abnormal condition.

3. A microcomputer according to claim 1 wherein:
said electrically erasable memory is a flash memory.

4. A one-chip microcomputer comprising:
an EEPROM (Electrically Erasable Programmable Read-Only Memory) for temporarily storing thereinto externally supplied user data;
a read-only memory for previously storing thereinto a program; and
a CPU (Central Processing Unit) for reading said program from said read-only memory causing said CPU to produce ECC (Error Correction Code) data based upon said temporarily stored user data in accordance with said program, and for storing said temporarily stored user data in a user data storage region of said EEPROM and said produced ECC data in an ECC data storage region of said EEPROM at the same time and using the same address to enable sequential correction of errors contained in said temporarily stored user data.

5. A one-chip microcomputer according to claim 4 wherein:
while a preselected amount of said user data are sequentially entered from an external data source, said CPU sequentially produces the ECC data from said preselected amount of user data; writes both the user data and the ECC data corresponding to said user data into the user data storage region of said EEPROM and also said ECC data storage region thereof respectively at the same addresses of said EEPROM; and reads both the user data and the ECC data from said user data/ECC data storage regions at the same addresses so as to sequentially perform said error correction.

6. A one-chip microcomputer according to claim 4 wherein:
while a preselected amount of said user data are sequentially entered from an external data source, said CPU sequentially produces the ECC data from said preselected amount of user data until one process cycle is completed; writes said user data and ECC data produced after one process cycle has been completed into the user data storage region of said EEPROM and an ECC data storage region thereof having an address decremented by 1 from the address of said user data storage region; and also reads both the user data and the ECC data stored at the same addresses of the EEPROM so as to sequentially perform said error correction.

7. A one-chip microcomputer according to claim 4 wherein:
while a preselected amount of said user data are sequentially entered from an external data source, said CPU sequentially produces the ECC data from said preselected amount of user data until one process cycle is completed; writes said user data and ECC data produced after one process cycle has been completed into the user data storage region of said EEPROM and the ECC data storage region thereof at the same addresses, respectively; and also reads the user data stored in the user data storage region of said EEPROM and ECC data stored in the ECC data storage region thereof having an address incremented by 1 from the address of said user data storage region so as to sequentially perform said error correction.

8. A one-chip microcomputer according to claim 4 wherein:
While a preselected amount of user data are sequentially entered from an external data source, said CPU sequentially produces the ECC data from said preselected amount of user data; outputs invalid data in the case that the production of said ECC data is not accomplished until next user data is entered; writes both said user data and valid ECC data corresponding thereto into the user data storage region of said EEPROM and the ECC data storage region thereof at the same addresses, respectively; and also reads the user data and the ECC data stored at the same addresses of said user data/ECC data storage regions of the EEPROM so as to execute the error correction.

9. A one-chip microcomputer comprising:
an EEPROM (Electrically Erasable Programmable Read-Only Memory) for temporarily storing thereinto externally supplied user data;

storage means for previously storing thereinto a program;

a CPU (Central Processing Unit) for reading said program from said storage means causing said CPU to produce ECC (Error Correction Code) data from said temporarily stored user data in accordance with said program, and for storing said temporarily stored user data in a user data storage region of said EEPROM and said produced ECC data in an ECC data storage region of said EEPROM at the same time and using the same address, and further for reading said user data stored in said user data storage region and said ECC data stored in said ECC data storage region to correct an error contained in said temporarily stored user data based upon both said read user data and said read ECC data; and write control means for controlling storing of both said temporarily stored user data and said produced ECC data in said EEPROM.

10. A one-chip microcomputer according to claim 9 wherein:

said CPU includes an internal register into which a preselected amount of user data are sequentially stored from an external data source;

said EEPROM further includes a user data register to which said preselected amount of user data are transferred, and an ECC data register; and said CPU produces ECC data from a predetermined amount of user data stored in said internal register thereof; transfers said produced ECC data to said ECC data register contained in said EEPROM; writes both the user data of said user data register and the ECC data of said ECC data register into the user data storage region of the EEPROM and the ECC data storage region thereof at the same addresses; and also reads both the user data and the ECC data stored at the same addresses of said EEPROM so as to perform the error correction.

11. A one-chip microcomputer according to claim 9 wherein:

said write control means further includes a user data stack register into which a preselected amount of user data are stored from an external data source, and an ECC data stack register;

said CPU further includes an internal register into which a preselected amount of user data are stored from the external data source;

in a first process cycle, said CPU transfers user data stored at a first address to said user data register contained in said write control means, and stores the user data transferred to said user data register into the user data storage region contained in said EEPROM;

in a next process cycle and succeeding process cycles, said CPU produces ECC data from a predetermined amount of user data stored in the preceding process cycle; transfers said produced ECC data to said ECC data stack register contained in said write control means; transfers the user data to said user data stack register contained in said EEPROM and also the ECC data to the ECC data register; decrements a write address by 1 with respect to the ECC data storage region of said EEPROM; and writes both the user data stored in said user data register and the ECC data stored in said ECC data register into both the user data storage region and the ECC data storage region of said EEPROM, respectively; and also repeatedly executes the above-defined process operations thereof;

in a final process cycle, said CPU produces ECC data from a predetermined amount of user data stored in the preceding process cycle; transfers said produced ECC data to said ECC data stack register contained in said write control means; transfers the produced ECC data to the ECC data register contained in said EEPROM; decrements a write address by 1 with respect to the ECC data storage region of said EEPROM; and writes the ECC data stored in said ECC data storage region of said EEPROM;

said CPU reads both the user data and the ECC data stored at the same addresses of the EEPROM so as to sequentially execute the error corrections.

12. A one-chip microcomputer according to claim 9 wherein:

said write control means further includes a user data stack register into which a preselected amount of user data are stored from an external data source, and an ECC data stack register;

said CPU further includes an internal register into which a preselected amount of user data are stored from the external data source;

in a first process cycle, said CPU transfers user data stored at a first address to said user data register contained in said write control means, and stores the user data transferred to said user data register into the user data storage region contained in said EEPROM;

in a next process cycle and succeeding process cycles, said CPU produces ECC data from a predetermined amount of user data stored in the preceding process cycle; transfers said produced ECC data to said ECC data stack register contained in said write control means; transfers the user data to said user data stack register contained in said EEPROM and also the ECC data to the ECC data register; and writes both the user data stored in said user data register and the ECC data stored in said ECC data register into both the user data storage region and the ECC data storage region of said EEPROM, respectively; and also repeatedly executes the above-defined process operations thereof;

in a final process cycle, said CPU produces ECC data from a predetermined amount of user data stored in the preceding process cycle; transfers said produced ECC data to said ECC data stack register contained in said write control means; transfers the produced ECC data to the ECC data register contained in said EEPROM; and writes the ECC data stored in said ECC data storage region of said EEPROM; and also reads both user data of said EEPROM and ECC data stored at an address incremented by 1 from an address of said read user data so as to sequentially execute the error correction.

* * * * *